United States Patent
Boyer et al.

(10) Patent No.: US 7,956,808 B2
(45) Date of Patent: Jun. 7, 2011

(54) METHOD FOR POSITION ESTIMATION USING GENERALIZED ERROR DISTRIBUTIONS

(75) Inventors: Pete A. Boyer, Chesterbrook, PA (US); Rashidus S. Mia, Phoenixville, PA (US); Edward J. Segall, Narberth, PA (US)

(73) Assignee: TruePosition, Inc., Berwyn, PA (US)

( * ) Notice: Subject to any disclaimer, the term of this patent is extended or adjusted under 35 U.S.C. 154(b) by 247 days.

(21) Appl. No.: 12/346,146

(22) Filed: Dec. 30, 2008

(65) Prior Publication Data

US 2010/0164781 A1 Jul. 1, 2010

(51) Int. Cl.
G01S 5/02 (2010.01)
(52) U.S. Cl. .................................................. 342/451
(58) Field of Classification Search .................. 342/451, 342/387
See application file for complete search history.

(56) References Cited

U.S. PATENT DOCUMENTS

| | | | |
|---|---|---|---|
| 4,688,187 | A | 8/1987 | McWhirter |
| 5,252,982 | A | 10/1993 | Frei |
| 6,564,065 | B1 | 5/2003 | Chang et al. |
| 2004/0002347 | A1 | 1/2004 | Hoctor et al. |
| 2005/0192024 | A1 | 9/2005 | Sheynblat |
| 2005/0267677 | A1 | 12/2005 | Poykko et al. |
| 2005/0281363 | A1 | 12/2005 | Qi et al. |
| 2007/0247368 | A1 | 10/2007 | Wu |

OTHER PUBLICATIONS

Y. Qi et al, Analysis of wireless geolocation in a non-line-of-sight environment, IEEE Transactions on Wireless Communications, vol. 5(3), p. 672-681, Mar. 2006.*

J. Caffery, "Radiolocation Algorithms," *Wireless Location in CDMA Cellular Radio Systems*, Boston-London: Kluwer Academic Publishers, 2000, pp. 60-63.

A. Papoulis, "Moments and Conditional Statistics," *Probability Random Variables, and Stochastic Processes*, McGraw Hill Inc., New York, NY, 1984, pp. 150-151, 160-162.

R. McDonough, A. Whalen, "Chapter 10: Estimation of Signal Parameters," *Detection of Signals in Noise*, 2nd Ed., Academic Press., San Diego, CA, 1995, pp. 404-417.

A. Oppenhem and A. Willsky, "2.3.2 The Continuous-Time Unit Step and Unit Impulse Functions," *Signals and Systems*, Prentice-Hall, Inc., Englewood Cliffs, NJ, 1983, pp. 22-25.

PCT Application No. PCT/US2009/067886: International Search Report and Written Opinion, mailed Mar. 3, 2010.

\* cited by examiner

*Primary Examiner* — Thomas H Tarcza
*Assistant Examiner* — Fred H Mull
(74) *Attorney, Agent, or Firm* — Woodcock Washburn LLP

(57) ABSTRACT

A method for improving the results of radio location systems that incorporate weighted least squares optimization generalizes the weighted least squares method by using maximum a posteriori (MAP) probability metrics to incorporate characteristics of the specific positioning problem (e.g., UTDOA). Weighted least squares methods are typically used by TDOA and related location systems including TDOA/AOA and TDOA/GPS hybrid systems. The incorporated characteristics include empirical information about TDOA errors and the probability distribution of the mobile position relative to other network elements. A technique is provided for modeling the TDOA error distribution and the a priori mobile position. A method for computing a MAP decision metric is provided using the new probability distribution models. Testing with field data shows that this method yields significant improvement over existing weighted least squares methods.

30 Claims, 20 Drawing Sheets

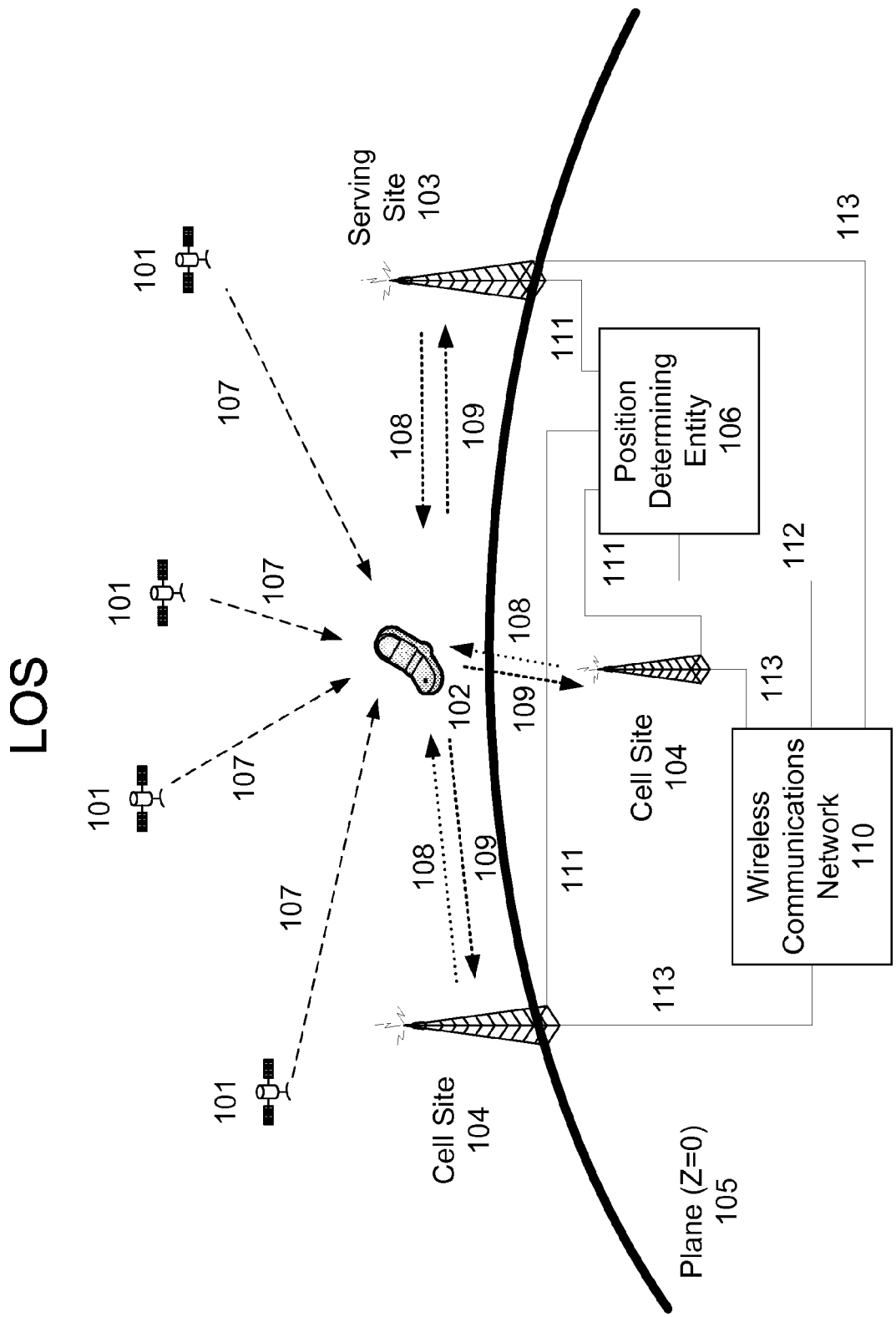
Figure 1 – Prior Art

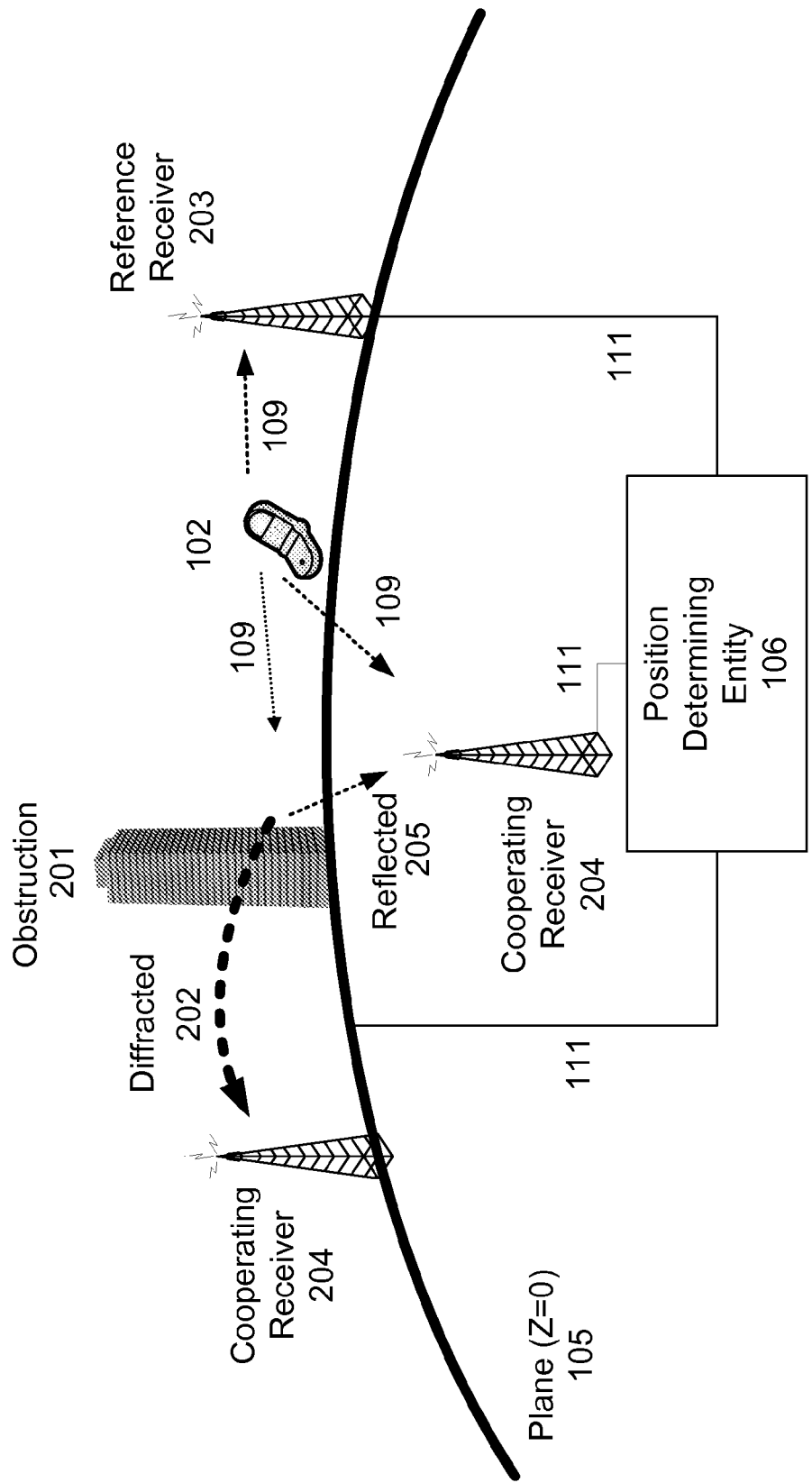
Figure 2A – Prior Art

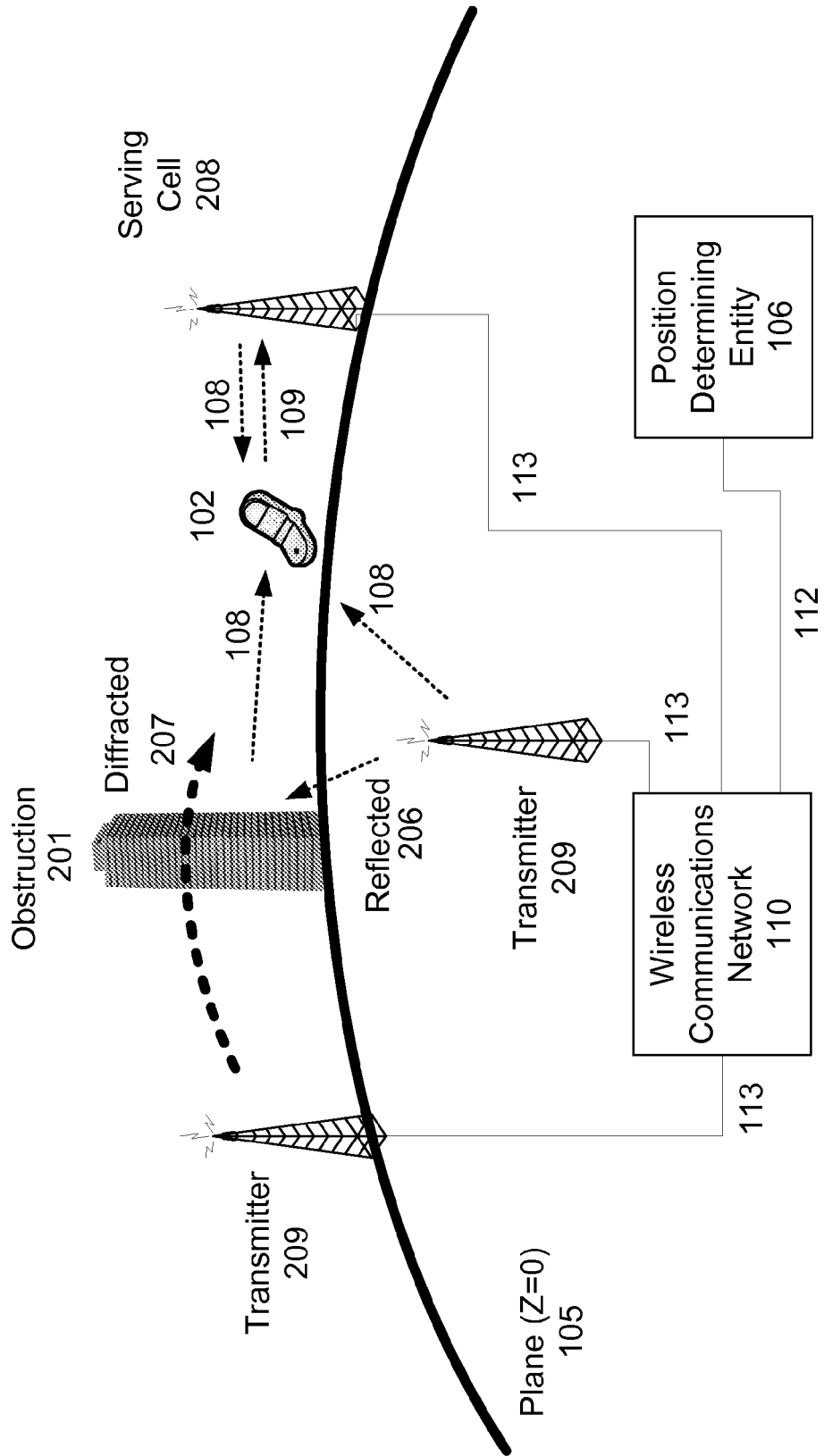
Figure 2B – Prior Art

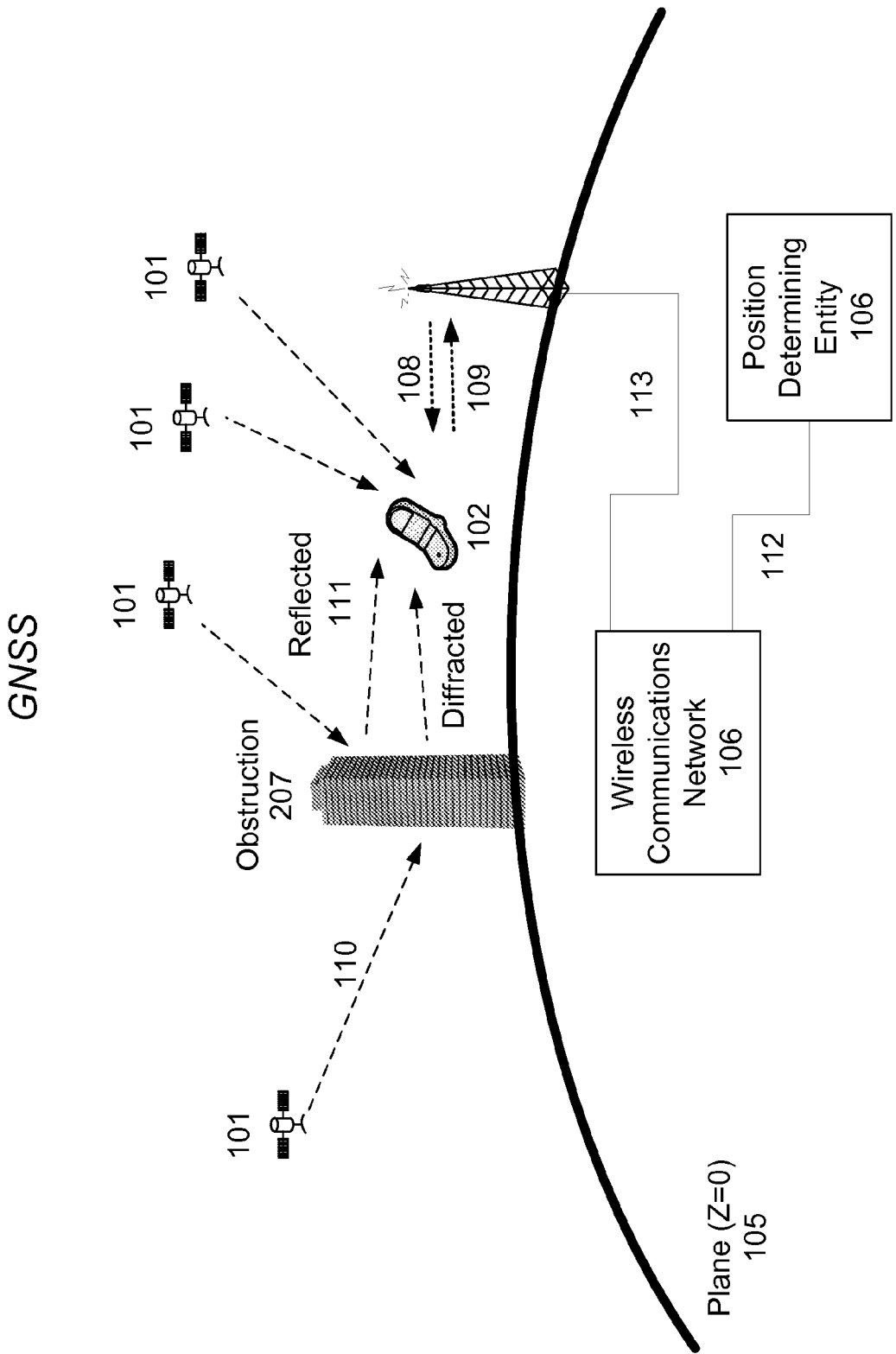
Figure 2C – Prior Art

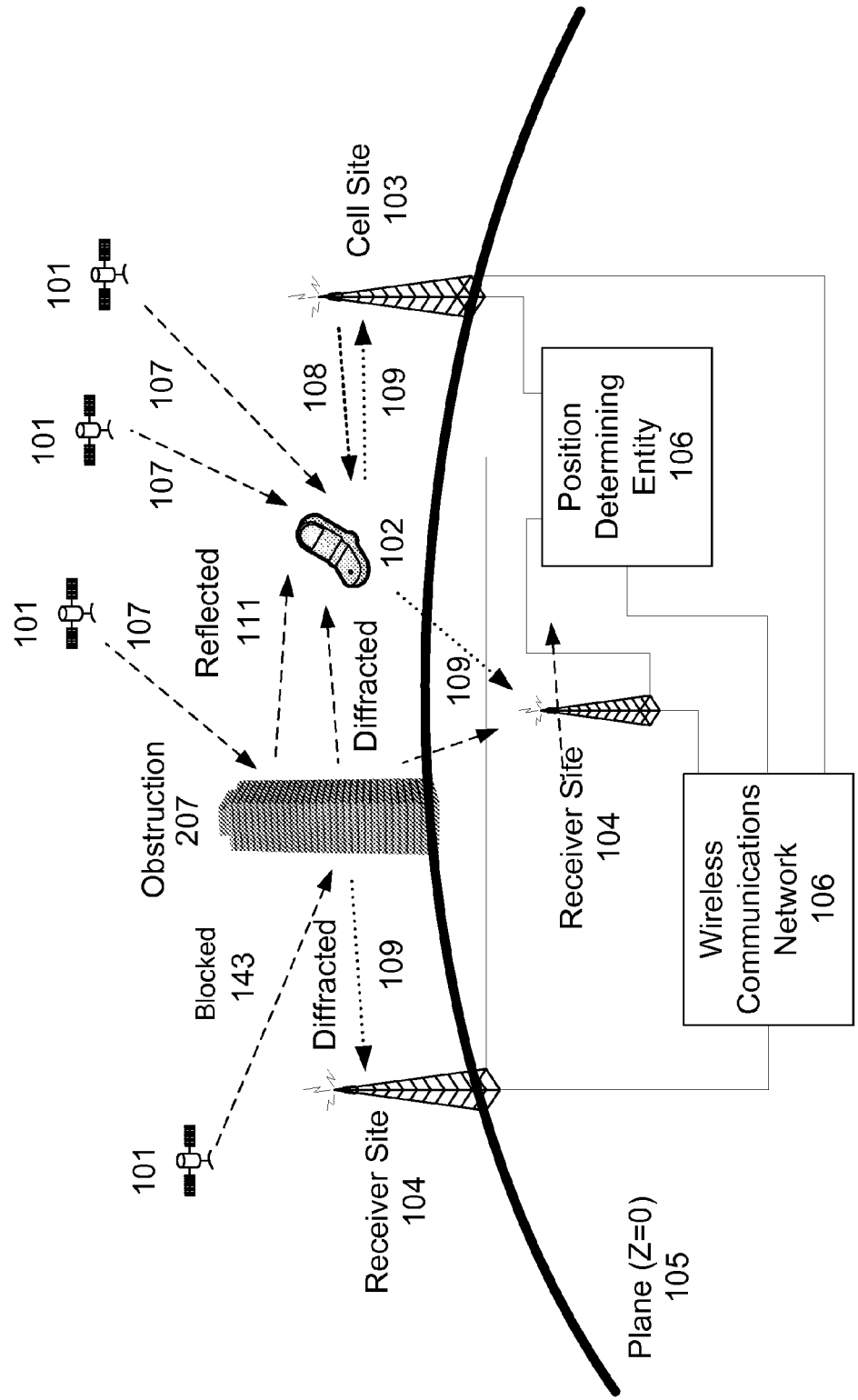
Figure 2D – Prior Art

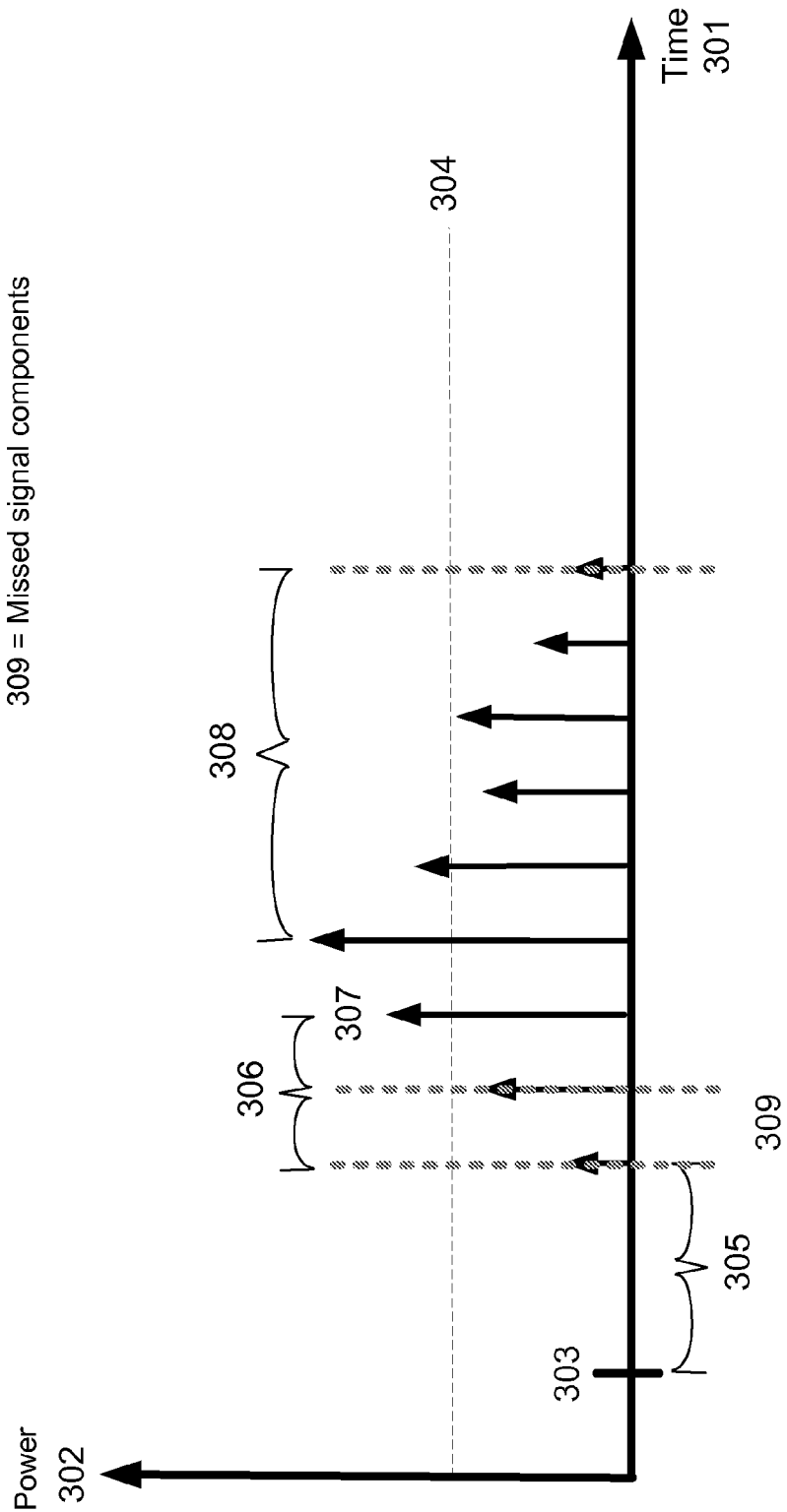
Figure 3 – Prior Art

METHOD FOR POSITION ESTIMATION USING GENERALIZED ERROR DISTRIBUTIONS

TECHNICAL FIELD

The present application relates generally to the field of wireless location, i.e., systems and methods for estimating the position of a wireless device, and more particularly to a method using generalized error distributions.

BACKGROUND

As the Federal Communications Commission (FCC) moves towards a PSAP-level location accuracy mandate, improving methods for different location technologies becomes a necessity. The subject matter described herein relates to the fields of communications and location technology. It provides a means for improving the accuracy of location technologies such as Global Positioning System (GPS), Uplink Time Difference of Arrival (UTDOA) and Advanced Forward Link Trilateration (AFLT).

A common approach to position estimation is to find a weighted least squares solution from measured quantities such as time differences, pseudoranges or power levels. The weighted least squares solution is known to achieve a maximum likelihood (ML) solution when input errors are independent and Gaussian (see J. Caffery, *Wireless Location in CDMA Cellular Radio Systems*, Boston-London: Kluwer Academic Publishers, 2000), but it cannot do this under the more general conditions encountered in practice. For example, TDOA errors have a tendency to be positive relative to the predicted leading edge of the multipath delay profile. As explained below, several factors such as imperfect leading edge detection and non-line-of-sight (NLOS) propagation contribute to these positive errors. As a result, the per-baseline error distribution is skewed. This skew reduces the accuracy of the basic weighted least squares method. In contrast, the method described herein exploits knowledge of this skew to obtain improved results. Moreover, correlation among these errors can often be found; for example, distinct multipath components can be received at the same sector, common NLOS conditions may exist at a site and common errors may be introduced by the reference signal. These correlations may be incorporated into a maximum a posteriori (MAP) algorithm as described below. This framework can also be used to incorporate an estimate of the a priori mobile position distribution in the location solution.

UTDOA is a network-based technology allowing for any signal transmitted from any type of mobile station (MS) to be received at any base station to obtain a UTDOA measurement. A reference base station measures the received signal at roughly the same time as each cooperating base station, as illustrated in FIG. 1.

FIG. 1 shows an idealized model of the signals available to or from a mobile device for positioning where the present invention could be used to increase the accuracy of the positioning estimate (also called a location attempt). This figure also identifies the system components for wireless location. In FIG. 1, a Global Navigation Satellite System 101 (GNSS) such as the United States NavStar Global Positioning System (GPS), broadcasts well defined, code division multiple access (CDMA) spread spectrum signals 107 used by specially equipped mobile wireless devices 102 for TDOA location estimation of latitude, longitude, altitude and velocity. If the mobile device 102 is not equipped to receive satellite signals 107 for location calculation, both uplink and downlink terrestrial wireless techniques using TDOA or Time-of-Arrival (TOA) calculations may be used to provide a location estimate. Terrestrial wide area wireless location techniques using downlink (network based transmitter-to-device) TDOA or TOA techniques include Advanced Forward Link Trilateration (FLT) [IS-95, IS-2000], Enhanced Time Difference of Arrival (E-OTD) [GSM] and Observed Time Difference of Arrival (OTDOA) [UMTS] as well as distributed beacon techniques. Terrestrial Downlink techniques require that the mobile device 102 measure the downlink radio signals 108 from network based transmitters 103 104 and then use the radio link(s) 109, backhaul facilities 113 and the Wireless Communications Network 110 to convey the collected radio measurements to a Position Determining Entity (PDE) 106 for conversion into a latitude, longitude and in some cases an altitude.

Terrestrial wide area wireless location techniques using uplink (device-to-network based receiver) TDOA or TOA techniques include U-TDOA, U-TDOA/Angle of Arrival (AoA) hybrid and U-TDOA/Assisted GPS. U-TDOA and hybrids currently function in CDMA [IS-95, IS-2000], GSM, UMTS, WiMAX (802.16e/m and 802.20) and conceptually for the upcoming Long-Term-Evolution (LTE) OFDM based wireless radio access network (RAN). Terrestrial Uplink techniques require that the mobile device 102 transmissions 109 be measured by network based receivers (in this case co-located within the cell sites 103 104. Measurement data is then conveyed by backhaul 111 to a Position Determining Entity (PDE) 106 for conversion into a latitude, longitude, velocity, and in some cases an altitude. Regardless of the aforementioned wireless location technique, determination of the radio signal time-of-flight is key to accurate determination of the mobile devices 102 actual location. In FIG. 1, the real world influences of signal reflection, diffraction, and attenuation due to constructive or destructive interference are not shown.

In the system of FIG. 1, by cross-correlating the received signal at the reference base station with the received signal at a cooperating base station, a time difference of arrival is determined. The cooperating stations send their TDOA measurements to a position determining entity (PDE) where a location solution is found. However, impairments to the measurement can arise from additive noise and signal level fluctuations. These impairments may affect the sensitivity of detecting the presence of the mobile signal at the cooperating base station. Other impairments to the estimation impact the cooperator's ability to detect the line of sight (LOS) path delay.

FIGS. 2A, 2B, 2C, and 2D illustrate how objects, such as a building, may block the direct path, creating a non-line of sight impairment in different location environments, including uplink, downlink, GNSS and hybrid GNSS/uplink systems (where GNSS stands for Global Navigation Satellite System). A diffracted path traveling around a building arrives at the receiver later than the highly attenuated or completely blocked direct path. Additionally, reflections from obstacles can cause scattering, which produces dispersion of the arrival times of different paths. In FIG. 2A, an example of an uplink wireless location system is depicted. The mobile device 102 transmits a signal 109. In some cases, such as for the Reference Receiver 203, the radio signal is received directly (a line-of-sight or LOS case). But other receivers 104 may receive diffracted signal 202 or a reflected signal 203. In each case the original uplink signal 109 may also be received or have the original signal blocked, attenuated or delayed by an obstruction 201.

FIG. 3 illustrates impairments that make detection of the first arrival difficult and cause a skewing of the TDOA error. The reference numerals in FIG. 3 are used as follows:

303=Transmit time
304=Detection threshold
305=Line-of-sight (LOS) time-of-flight
306=Lag time
307=Basis for reported TOA or TDOA
308=Delay spread
309=Missed signal components FIG. 3 shows the arrival times of a multi-path degraded signal on an amplitude 302 to time 301 plot 300. A signal is transmitted at time 303 and has a potential direct path time-of-flight shown as 305. The earliest signal component arrivals are undetected since they arrive at a power level below the detection threshold 304. The detection threshold 304 must be maintained to avoid excessive false alarms. Missed earliest arrival detection events cause a reported TOA or TDOA that is larger than the LOS TOA or TDOA which is desired. In this example the first signal above threshold 307 produces a lag of 306 from the true first arriving signal component. Additionally, the earliest arriving multipath components may arrive later than expected due to NLOS propagation creating an NLOS delay. This also causes a reported TDOA that is larger than the LOS TDOA. These factors skew errors between the TDOA measurements and an LOS TDOA being searched or computed by positioning algorithms. Positioning decisions in the inventive solution described herein exploit both the skewing of errors caused by these factors as well as the non-Gaussian shape of the error distribution.

The method described in U.S. Pat. No. 6,564,065, May 13, 2003, K. Chang et al., "Bayesian-update based location prediction method for CDMA Systems," appears to predict power levels from CDMA pilot channel measurements with location decisions made from an a posteriori power distribution using simulation. The method described in U.S. Pat. No. 5,252,982, Oct. 12, 1993, E. Frei, "Method of precise position determination," appears to assume Gaussian errors using a weighted least squares method that iteratively finds phase ambiguities for a GPS location solution using an a posteriori RMS error.

SUMMARY

A method for improving the results of radio location systems that incorporate weighted least squares optimization generalizes the weighted least squares method by using maximum a posteriori (MAP) probability metrics to incorporate characteristics of the specific positioning problem (e.g., UTDOA). As discussed, WLS methods are typically used by TDOA and related location systems including TDOA/AOA and TDOA/GPS hybrid systems. The incorporated characteristics include empirical information about TDOA errors and the probability distribution of the mobile position relative to other network elements. A technique is provided for modeling the TDOA error distribution and the a priori mobile position. A method for computing a MAP decision metric is provided using the new probability distribution models.

An illustrative implementation provides an error detection method comprising: obtaining field data, wherein said field data have baseline or location dependent values to be used in said signal correlation model; analyzing said field data to obtain (1) a signal correlation model and associated measurement parameters, (2) correlation matrix rules, and (3) a model for a priori position; computing weights for the measurements based on an estimated variability of the measurement; using the weights along with the correlation matrix rules to generate a covariance matrix, and computing an inverse covariance matrix; performing an iterative search over a geographical region to find a location with a maximum a posteriori (MAP) metric; determining that a stopping condition has been reached; and reporting the geographic position with the largest MAP metric as the location solution.

The methods described herein include several key innovations, including but not necessarily limited to the following:

Analytical a priori distribution: Empirical data providing the actual locations are used to obtain a distribution for the normalized distance from the reference tower to the location solution in order to model the general shape of the a priori position relative to towers in the search area. An exponential distribution is shown to approximate the shape of the a priori position distribution and its variance is calculated from the empirical data.

Analytical TDOA error distribution: The double exponential distribution model is generalized to incorporate a skew and an arbitrary power in the exponent. Model parameters are estimated from empirical data.

Multipath/NLOS error indicators: Key indicators of the TDOA error distribution include the number of baselines, the predicted multipath correction (based on observed signal parameters and/or knowledge of the local RF environment) and the TDOA correlation of each baseline. Methods are provided to derive model parameters from these indicators by analyzing empirical data and generating conditional error distributions. For each baseline, model parameters such as the skew are computed from these indicators.

TDOA error correlation: Methods are provided for computing a posteriori probabilities for correlated errors between baselines that have the above analytical TDOA error distribution. These correlations are incorporated into the MAP algorithm through the corresponding joint error probability distribution.

Method for common bias mitigation: With more general distributions, it becomes difficult to find an analytical solution for the common bias that can exist in measurements. Methods for removal of the bias are provided along with various complexity-performance tradeoffs.

Iterative adjustment: An iterative procedure is developed that applies the above methods. This procedure includes initialization operations and estimation of residual values.

Other features of the inventive technology are described below.

BRIEF DESCRIPTION OF THE DRAWINGS

The attached drawings include the following:
FIG. 1: Illustration of a positioning network.
FIGS. 2A, 2B, 2C, and 2D: Illustration of impairments to LOS path delay estimation.
FIG. 3: Illustration of causes for measurement error skewing.

DETAILED DESCRIPTION OF ILLUSTRATIVE EMBODIMENTS

Figure 4A:
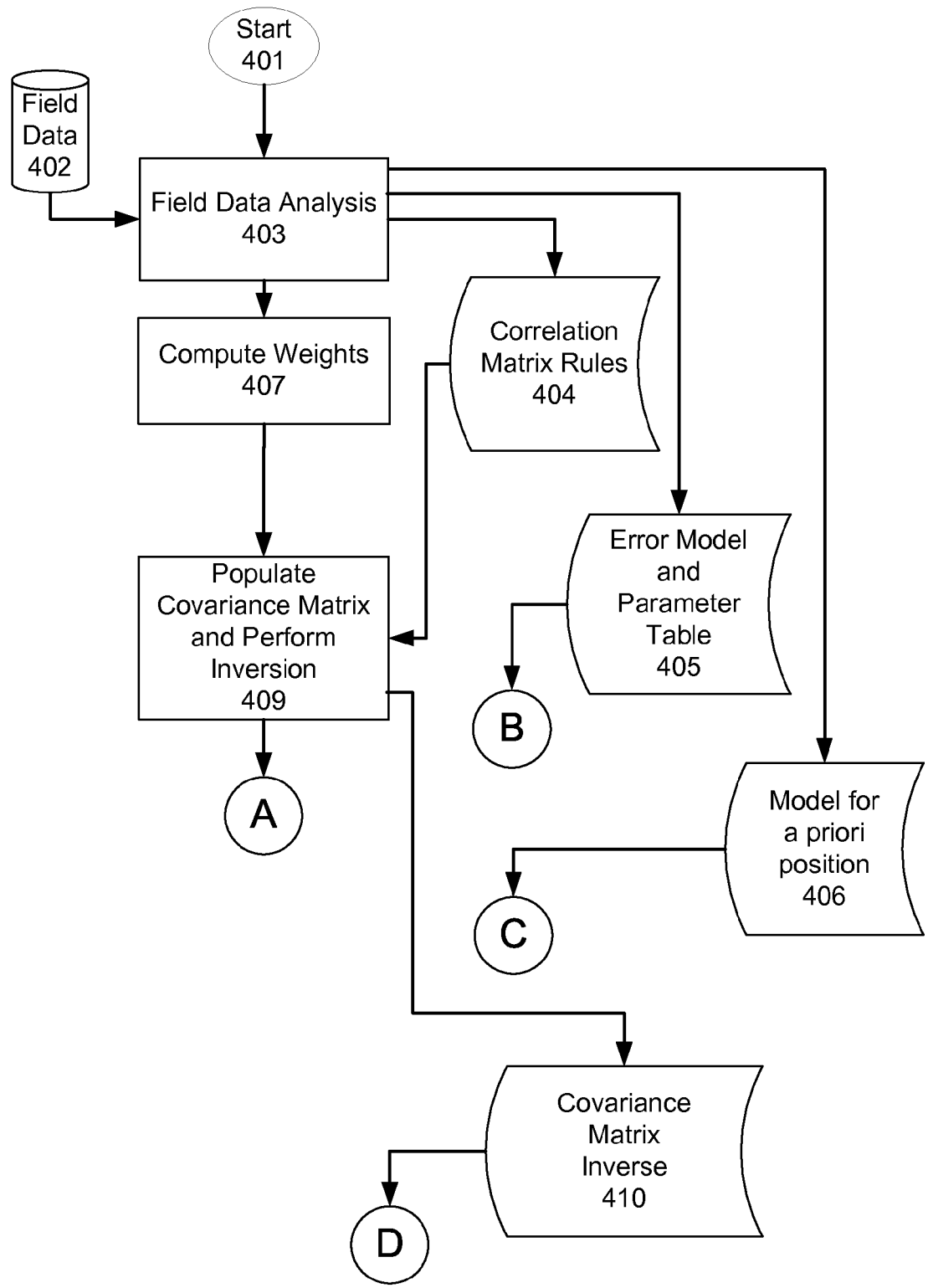
FIGS. 4A and 4B Components of MAP error detection method.
Figure 4B:
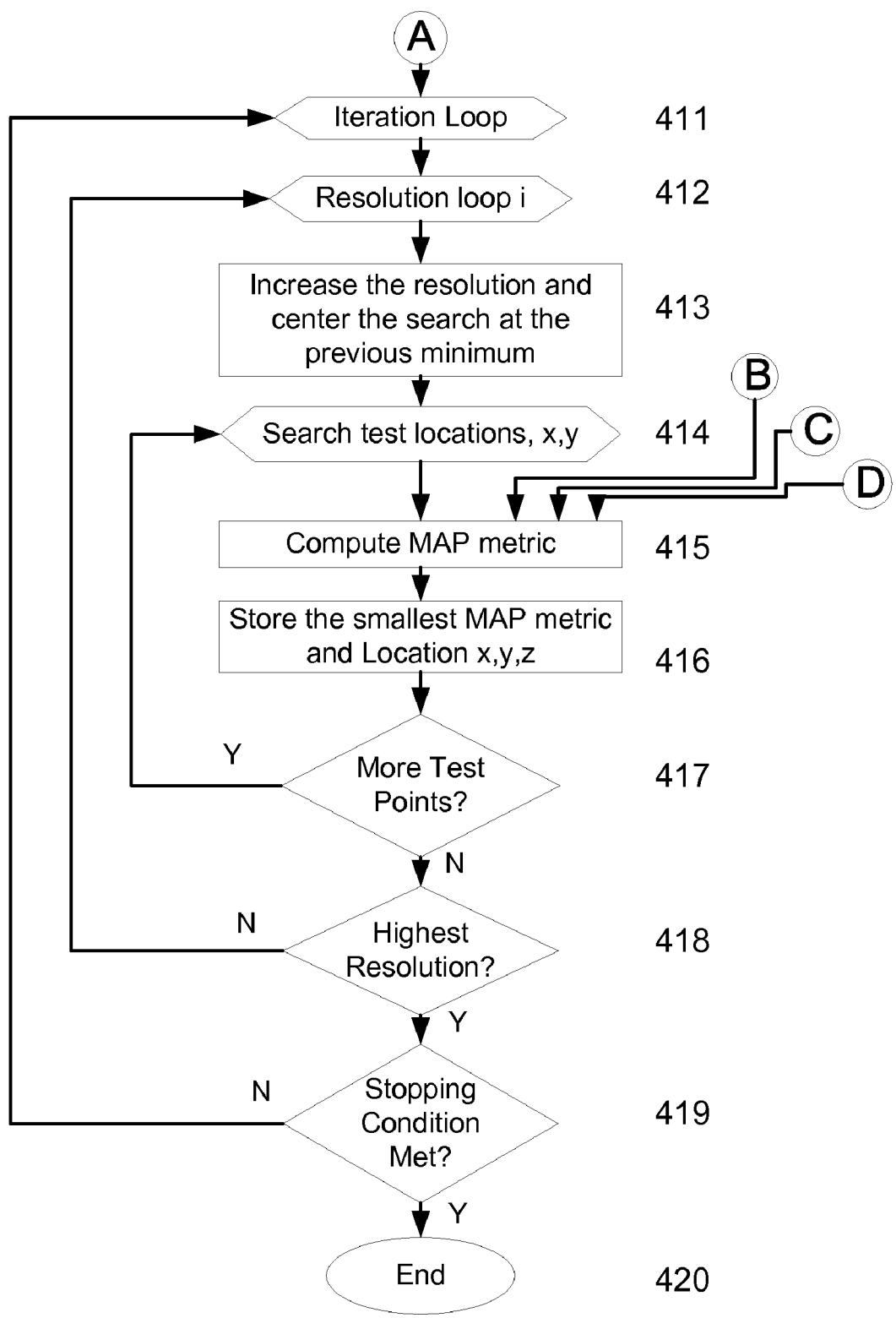

FIGS. 4A-4B show the components of an illustrative implementation of the MAP error detection method. As shown, the MAP process is started at step 401. Field data 402 is analyzed 403 to obtain a set of signal correlation rules and models. These models and associated measurement parameters are developed from field data that can have baseline or location (or position, where the terms location and position are used interchangeably herein) dependent values to be used in the model. For example, the error skew may be higher for low correlation UTDOA measurements. A table 405 may thus be generated. This table provides a mapping between the model parameter for the skew and the correlation value for the measurement. Similarly, a model and table is computed for the a priori location 406. The field data analysis process also analyzes the correlation between different receiver ports linking the location receiver (e.g., a Location Measuring Unit (LMU) or Signal Collection System (SCS)) to an external antenna, providing correlation values and rules for their application. For example, there may be small correlation of errors on ports at the same location (co-site ports) due to NLOS effects. Once the field data is analyzed, weights are computed for the measurements based on an estimated variability of the measurement. Then the weights are used along with the correlation matrix rules to generate a port by port covariance matrix, which is inverted at 409.

As shown in FIG. 4B, an iterative search over a geographical region is then performed where the goal is to find the location with the largest MAP metric. Once the iterative search is initiated 411, a resolution loop is entered 412 in which the geographic search space resolution is reduced in each iteration and new test points are generated via interpolation. The search may be re-centered at the previous iteration's minimum error point before proceeding. The current geographical region is searched 414 by computing the MAP metric 415 for each test point in the region and selecting the point with the smallest metric. The MAP metric computation uses the covariance matrix 404, the error models and the measurement parameter tables 405. If more test points exist in the search space, the processing logic 417 loops back to restart the search 414. If no test points are untested in the present search space provided by the current resolution, the MAP process checks the pre-set resolution limit set 418. If the highest resolution has not been reached, the process returns to step 412; otherwise the MAP process checks if one or more stopping criteria has/have been reached 419. When the stopping criteria are met, the MAP process ends 420 and the geographic position with the largest metric provides the location solution.

A goal of our inventive solutions is to model the a posteriori probability of the error and find the location solution that maximizes this probability. From the Bayes theorem (see A. Papoulis, *Probability Random Variables, and Stochastic Processes*, McGraw Hill Inc., New York, N.Y., 1984), the conditional probability density function of a random position vector, L is given in terms of a vector of N measurement errors, e, as $$f_{L|e}(L|e) = \frac{f_{e|L}(e|L) f_L(L)}{f_e(e)} \quad (1)$$

where, $$L \equiv \begin{bmatrix} x \\ y \\ z \end{bmatrix} \text{ is a random position vector} \quad (2)$$

$$e = \begin{bmatrix} e_1 \\ e_2 \\ \dots \\ e_N \end{bmatrix} \quad (3)$$

$$= \begin{bmatrix} \hat{\tau}_1 - \tau_1(x,y,z) - B \\ \hat{\tau}_2 - \tau_2(x,y,z) - B \\ \dots \\ \hat{\tau}_N - \tau_N(x,y,z) - B \end{bmatrix}$$

is the TDOA error plus a common bias and $\tau_i(x, y, z)$ is the LOS TDOA at point x,y,z for the ith baseline, $\hat{\tau}_i$ is the ith TDOA baseline measurement, and B is a common bias that may exist in the measurements To simplify computations, the log of (1) can be maximized since the position that maximizes (1) is also the position that maximizes the log of (1). The natural logarithm of (1) is $$ln(f_{L|e}(L|e)) = ln(f_{e|L}(e|L)) + ln(f_L(L)) - ln(f_e(e)) \quad (4)$$

Since the last term does not depend on the location it is constant when considering different locations so it can be ignored. This leaves the following function to be maximized over all locations:

$$ln(f_{L|e}(L|e)) = ln(f_{e|L}(e|L)) + ln(f_L(L)) \quad (5)$$

The first term is the log of the a posteriori error probability density and the second term is the log of the a priori probability density.

Error Distribution Modeling Process

Figure 5:
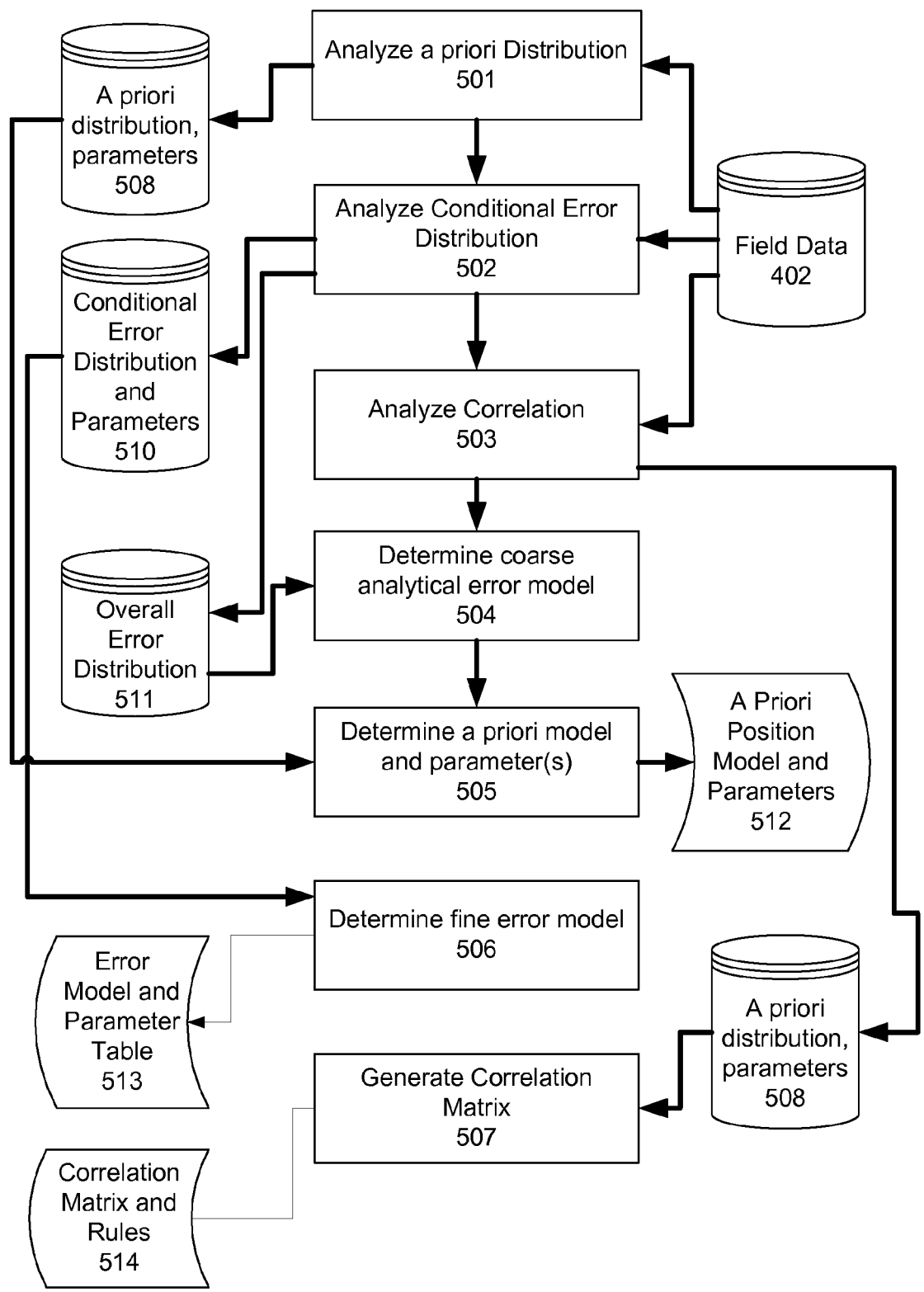
FIG. 5: Error distribution modeling process.

The error distribution modeling process is shown in FIG. 5. Initially field data 402 is analyzed to determine the impact of various baseline and location specific measurement parameters on the a priori position distribution and the error distribution. Next, the correlation between errors for different baselines is analyzed to determine correlation values and rules for obtaining these correlations. A coarse model for the error distribution 504 is found that fits the overall error distribution. A model for the a priori distribution is found based on the a priori distribution of the field data. The error distribution model is then refined in order to be modifiable based on the various location specific and baseline specific measurement parameters. Lastly, a correlation matrix is generated based on the correlation values and associated rules for applying the values.

A Priori Distribution

Figure 6:
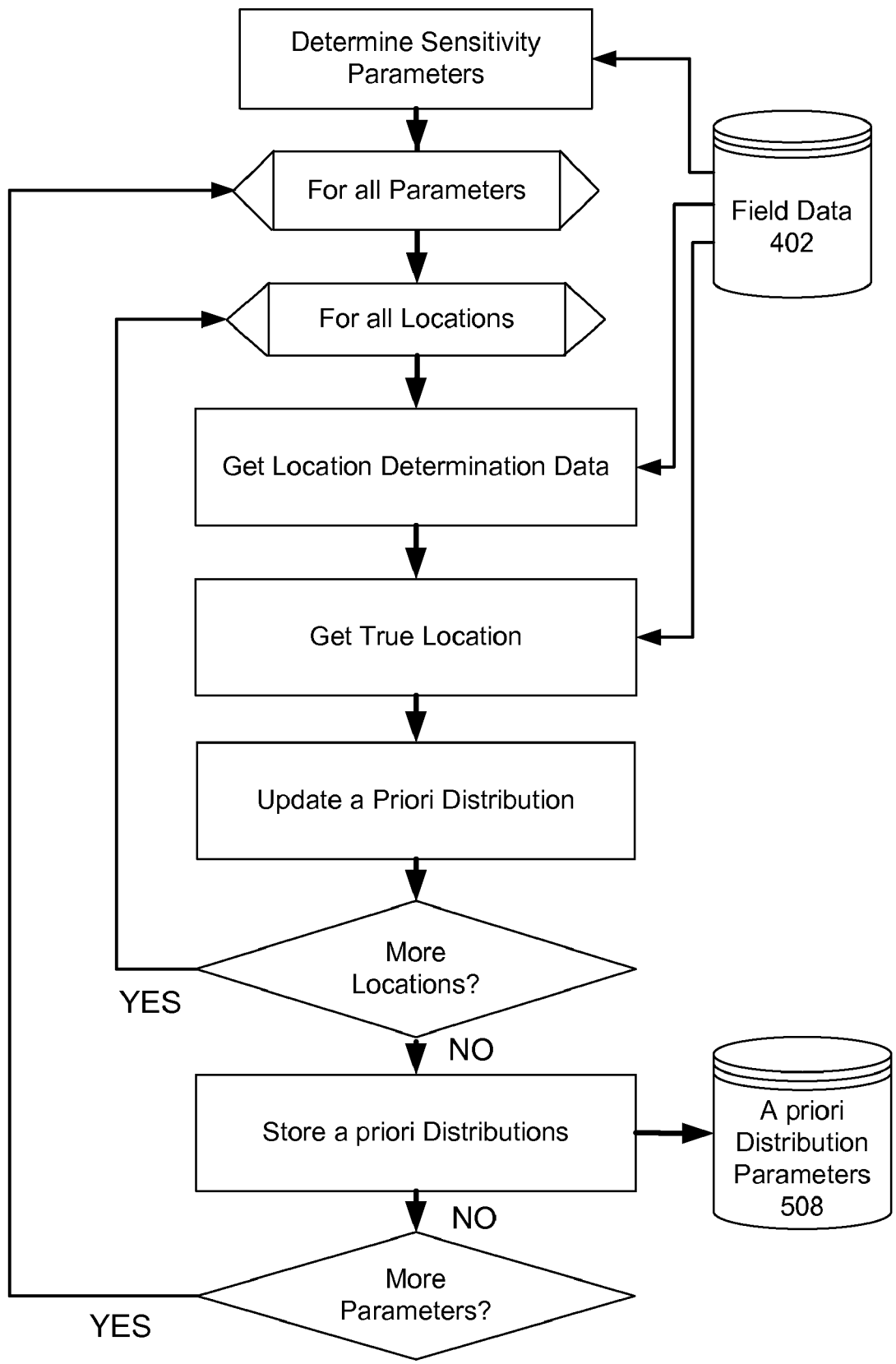
FIG. 6: Logic flow for the a priori distribution data analysis.

The logic for finding an appropriate a priori distribution is shown in FIG. 6. Since location search areas can have vastly different dimensions depending on the location-specific data and location problems may also have vastly different network configurations, it is desirable to find a distribution of a model parameter that is a function of the actual position in the search area. The position in the search area is the a priori location. It is desirable to find a model parameter that is a function of the a priori location that can be computed and used to determine an a priori location probability for use in equation (5). Initially, the field data is analyzed to determine candidate parameters. For example, the statistics for the distance from a reference tower may be representative of the a priori location. Alternatively, the distance from a serving tower may be considered. These distances may be normalized to the maximum search range. For each parameter, the ranges and bin sizes must be chosen and histograms representing the a priori distribution updated based on the actual (true) location in the field data. Each potential distribution is stored along with the parameter computation in an a priori parameters database.

Once the potential a priori distributions are computed for various model parameters, a model is selected as depicted in FIG. 5. The model is chosen to be both representative of the distribution from the field data and computationally efficient. An exemplary model parameter is chosen to be the distance of a candidate location from the reference tower normalized to the maximum distance from the reference tower to the edge of the search region. This provides a transformation from the three dimensional random vector, L, to a normalized random distance from the reference tower, D, as $$D = \frac{[(x - x_{ref})^2 + (y - y_{ref})^2 + (z - z_{ref})^2]}{R_{max}} \qquad (6)$$

where, $x_{ref}, y_{ref}, z_{ref}$ are the position coordinates of the reference tower $R_{max}$ is the maximum distance from the reference tower to the edge of the search region.

Figure 7:
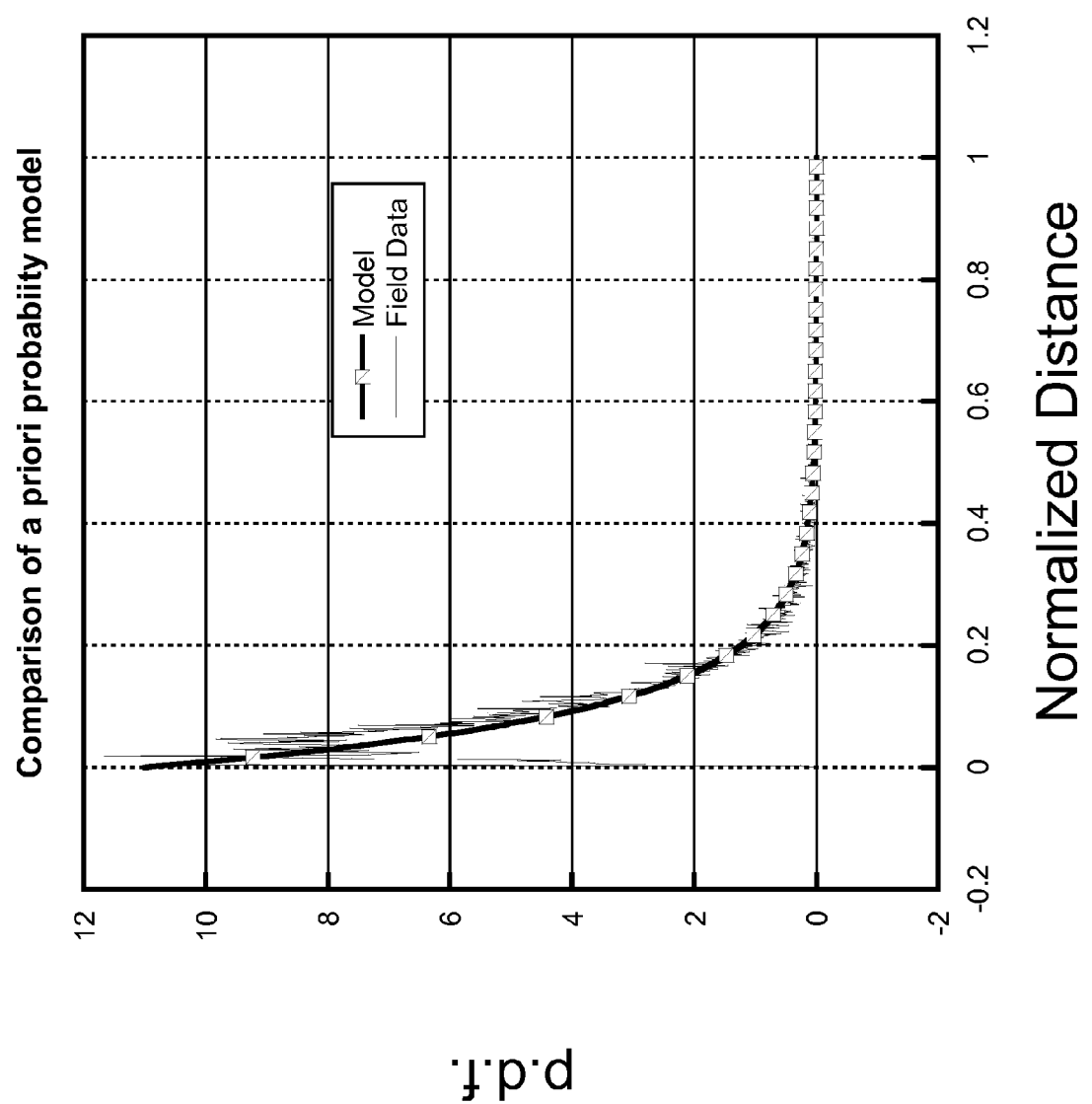
FIG. 7: Comparison of a priori location distribution with empirical model.

An exemplary model is chosen to be exponential as $$f_D(D) = \begin{cases} \lambda_a e^{-\lambda_a D} & x \geq 0 \\ 0 & \text{Otherwise} \end{cases} \qquad (7)$$

where, $\lambda_a = 11$ was chosen to fit the field data. FIG. 7 compares this model with the field data showing good agreement.

Error Distribution

Figure 8:
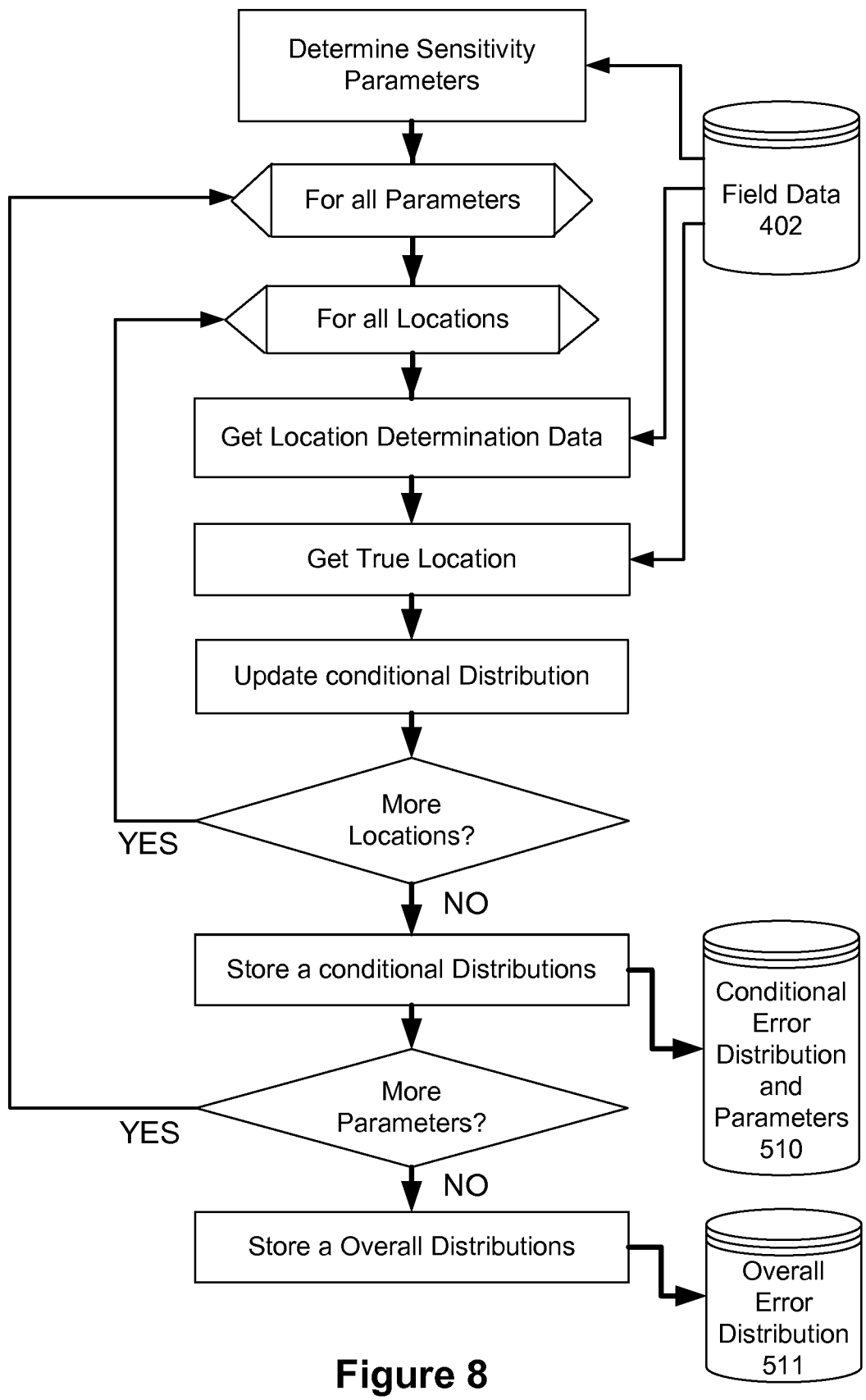
FIG. 8: Conditional error distribution data analysis.

The field data is also analyzed to obtain models for the error distribution. FIG. 8 shows a series of steps similar to those in the a priori data analysis. In the figure, measurement parameters are analyzed to determine which ones cause large changes in the error distribution. Exemplary measurement parameters include:

UTDOA correlation for each baseline,
Multipath correction factor for each baseline,
Number of measurements for each location.

Ranges and bin sizes for these parameters are determined for accumulating conditional and overall statistics. The conditional statistics and overall statistics are then compiled over all of the field data and stored for model determination.

Figure 9:
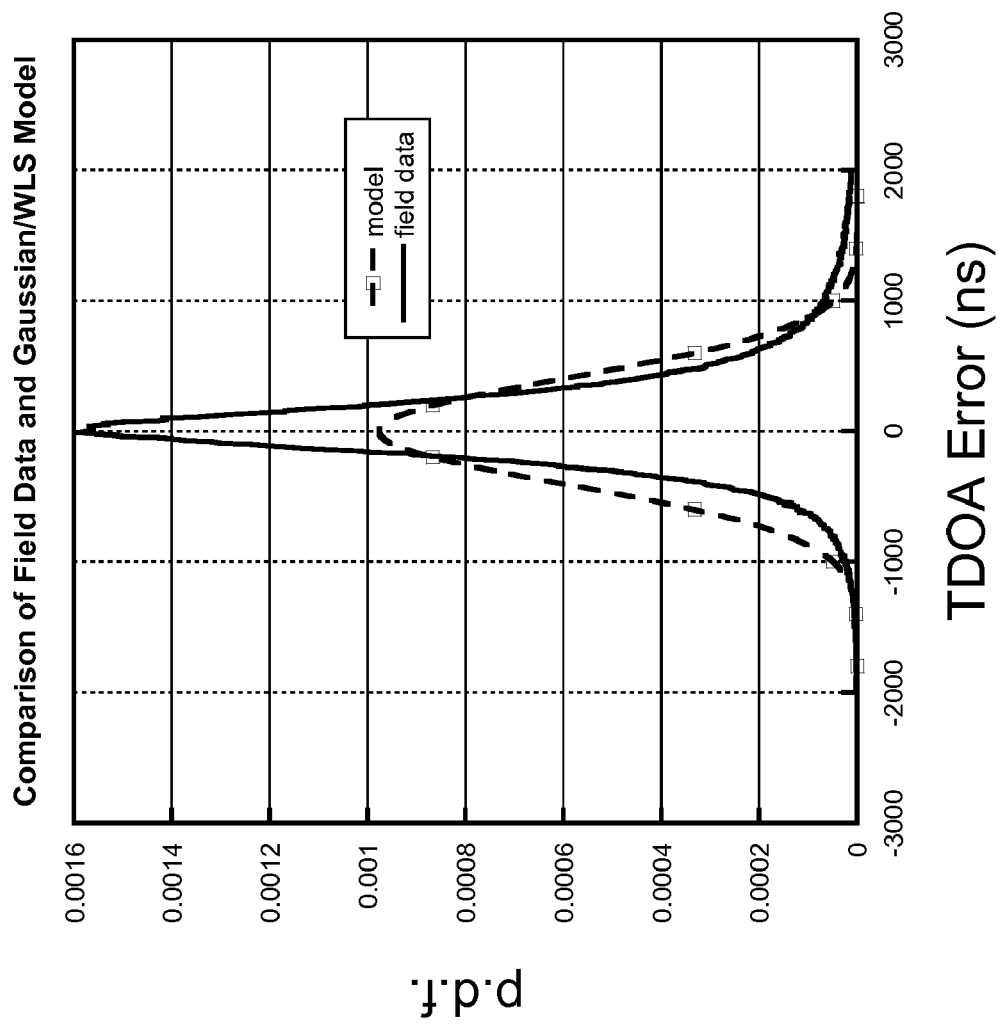
FIG. 9: Sample overall of error distribution vs. weighted least squares method.

A sample overall of error distribution is shown in FIG. 9 and compared with the Gaussian distribution as would be assumed by weighted least squares methods. From the figure, it is evident that the Gaussian assumption does not adequately model the shape of the overall distribution. A skewing of the overall distribution to the right is apparent.

The overall distribution provides input to the coarse error model as shown in FIG. 5. An exemplary error model for the ith marginal error is determined to be $$f_{e_i|L}(x_i) = \begin{cases} Ae^{\frac{k}{\sigma_i^p}|r_i x_i|^{p_i}} & x_i \geq 0 \\ Ae^{-\frac{k}{\sigma_i^p}\left|\frac{x_i}{r_i}\right|^{p_i}} & x_i < 0 \end{cases} \qquad (8)$$

where, $p_i$ is a model parameter that is an arbitrary exponential power greater than zero, $r_i$ is a model parameter that is a positive ratio indicating the skew of the distribution, and $\sigma_i$ is the standard deviation for the ith baseline.

Values for k and A are chosen that satisfy the condition $$\int_{-\infty}^{\infty} f_{e_i|L}(x) dx = 1$$

for a given $r_i$ and $p_i$. For a Gaussian distribution $r_i=1$, $p_i=2$ and $k=\frac{1}{2}$. For a double exponential distribution or Laplace distribution, $r_i=1$, $p_i=1$ and $k=\sqrt{2}$.

Figure 10:
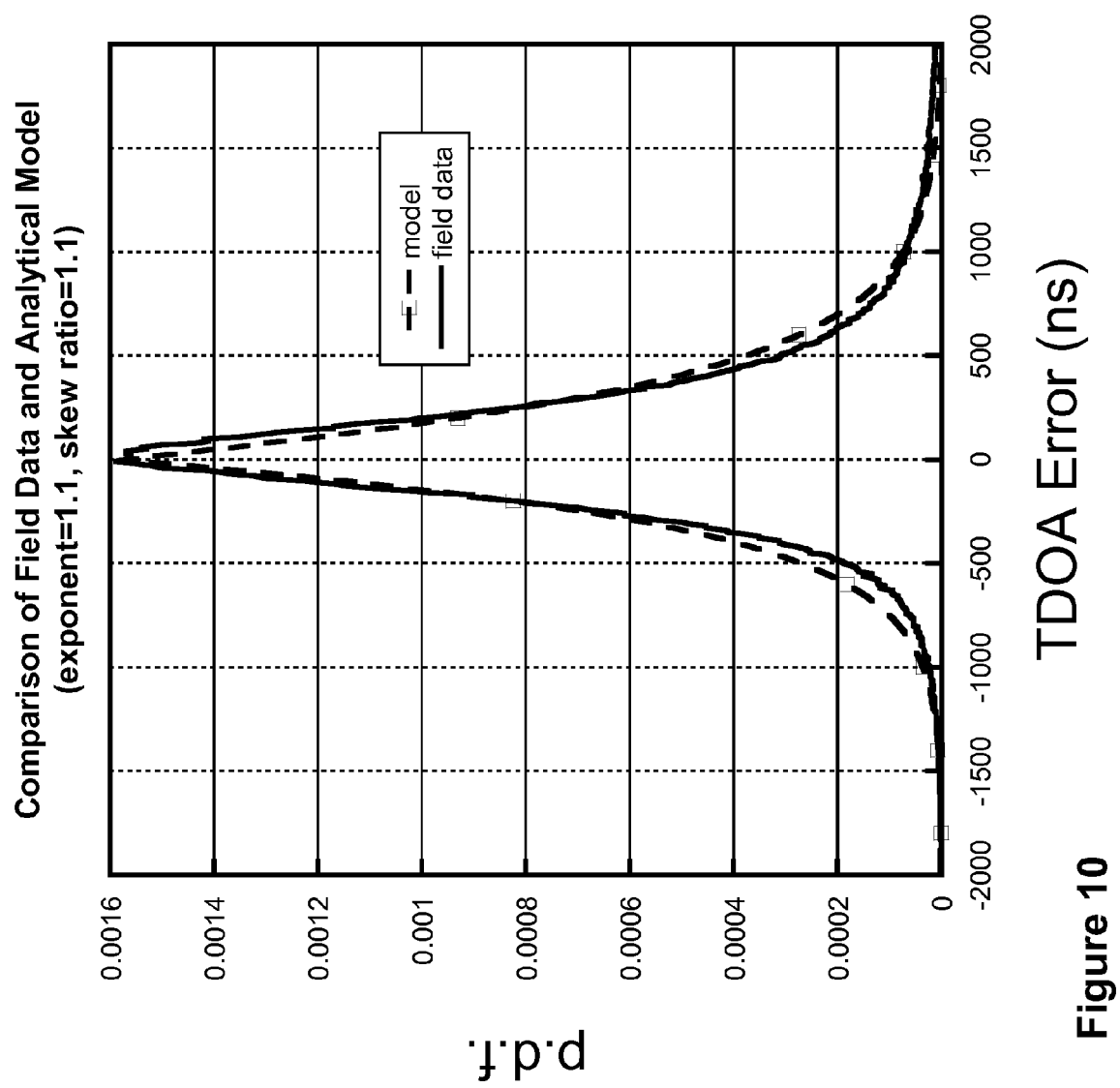
FIG. 10: Sample overall error distribution vs. new coarse model.

The coarse modeling step computes values for the model parameters in equation (8) that match the field data. FIG. 10 illustrates the effects of applying the coarse model with $p_i=1.1$ and $r_i=1.1$. The figure shows significantly better agreement with the field data than the Gaussian assumption shown in FIG. 9.

The conditional error distributions are used as input to the "determine fine error model" block 506 in FIG. 5. For the conditional error, the skew ratio is computed based on the mean and standard deviation of the error for each measurement parameter bin. The center of the bin is the conditional value for the error distribution.

The skew can be found in terms of the mean and standard deviation of the conditional distribution as follows. If the conditional error distribution is approximated as a double exponential, then the scaling factor in the exponent is $$\lambda = \sqrt{2}/\sigma \qquad (9)$$

where, $\sigma$ is the standard deviation of the conditional distribution.

To estimate $r_i$, two separate scaled exponential distributions are considered where one of them is flipped around zero. Both components of the distribution are scaled to integrate to ½. As a result, the mean, m, of the conditional distribution can be put in terms of the scaling factors as $$m = -\frac{1}{\lambda_L} + \frac{1}{\lambda_R} \qquad (10)$$

where, $\lambda_L$ and $\lambda_R$ are the scaling factors in the exponents of the separate exponential distribution components on the left and right of zero respectively. It is assumed that all of the skew is due to changes in $\lambda_R$ relative to $\lambda$ allowing for the assumption $\lambda_L \approx \lambda$. Solving equation (10) for $\lambda_R$ and using (9) with $\lambda_L \approx \lambda$ gives $$\lambda_R = \frac{1}{m + \frac{1}{\lambda_L}} \approx \frac{1}{m + \frac{\sigma}{\sqrt{2}}} \qquad (11)$$

The skew ratio from (9) and (11) is then $$r_i = \frac{\lambda_R}{\lambda_L} = \frac{\sigma}{\sqrt{2m} + \sigma} \tag{12}$$

Values for σ and m from the conditional error distribution can then be used to compute $r_i$ using equation (12).

Figure 11:
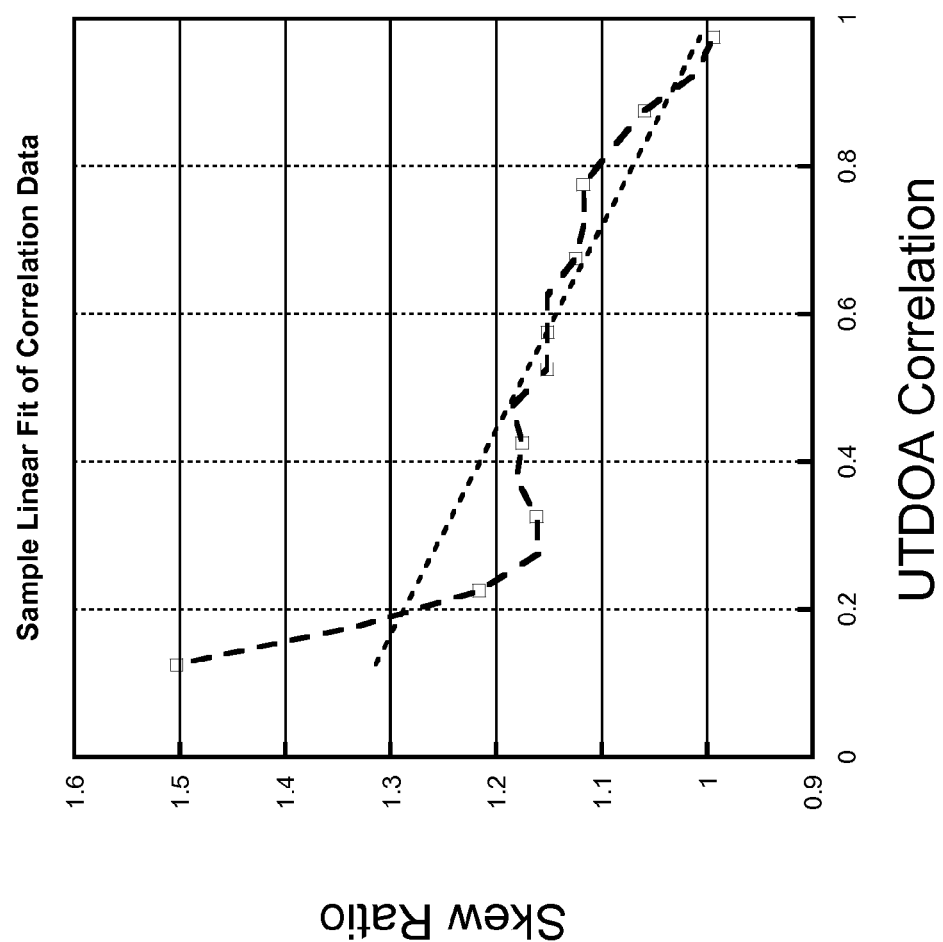
FIG. 11: Sample dependency of skew ratio to correlation.

An example of the skew ratio as a function of the UTDOA correlation is shown in FIG. 11. For each conditional distribution, the mean, m, and standard deviation, σ, are used in equation (12) to compute $r_i$. In the figure, it is evident that for low correlation, the skew increases. A linear fit to the data is shown which may be used in place of a table lookup to average out the variability that is a function of the number of samples and bin sizes. The result of the "fine error model determination" block 506 (FIG. 5) is a mapping of measurement parameter values, such as UTDOA correlation, to model parameters such as skew. Similar adjustments to the model parameter, $p_i$, in (8) can be made as a function of the various measurement parameter values.

Figure 12:
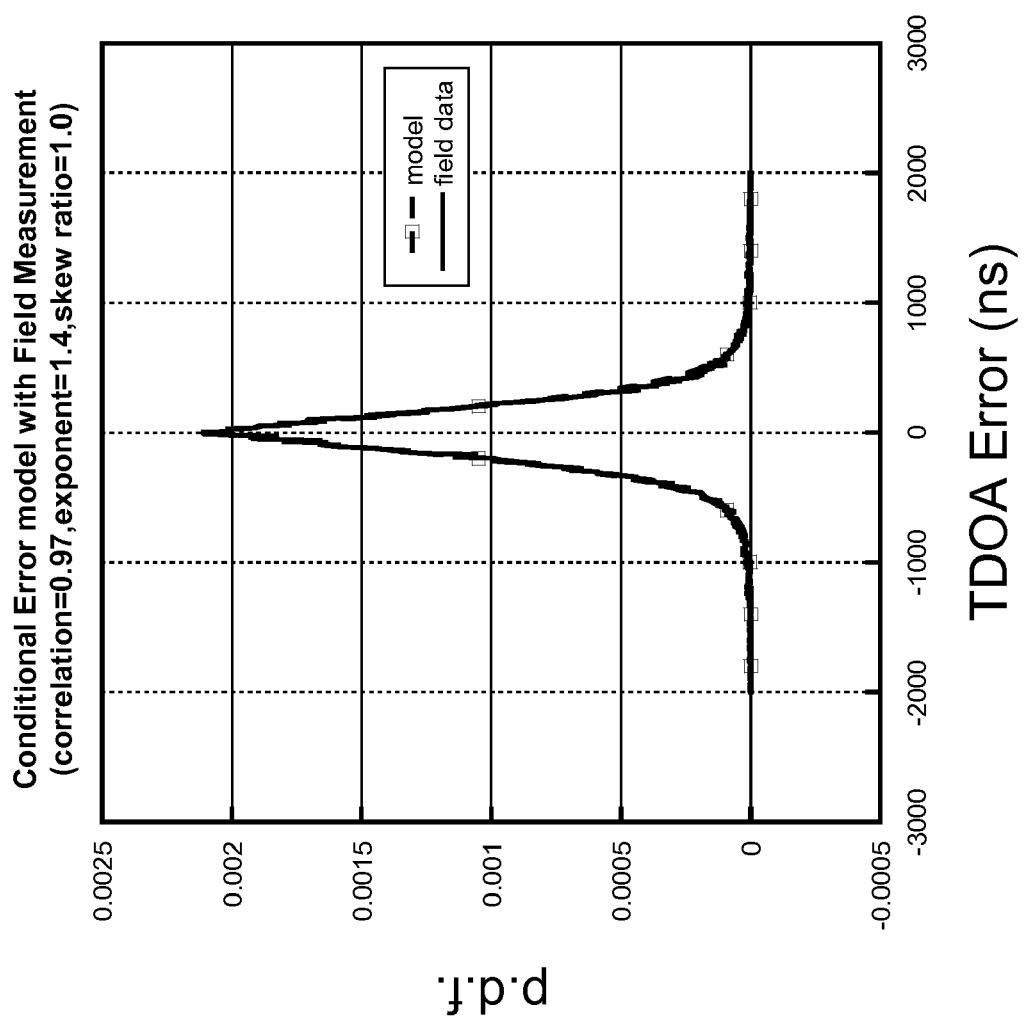
FIG. 12: Sample overall conditional error distribution vs. new model (small skew).
Figure 13:
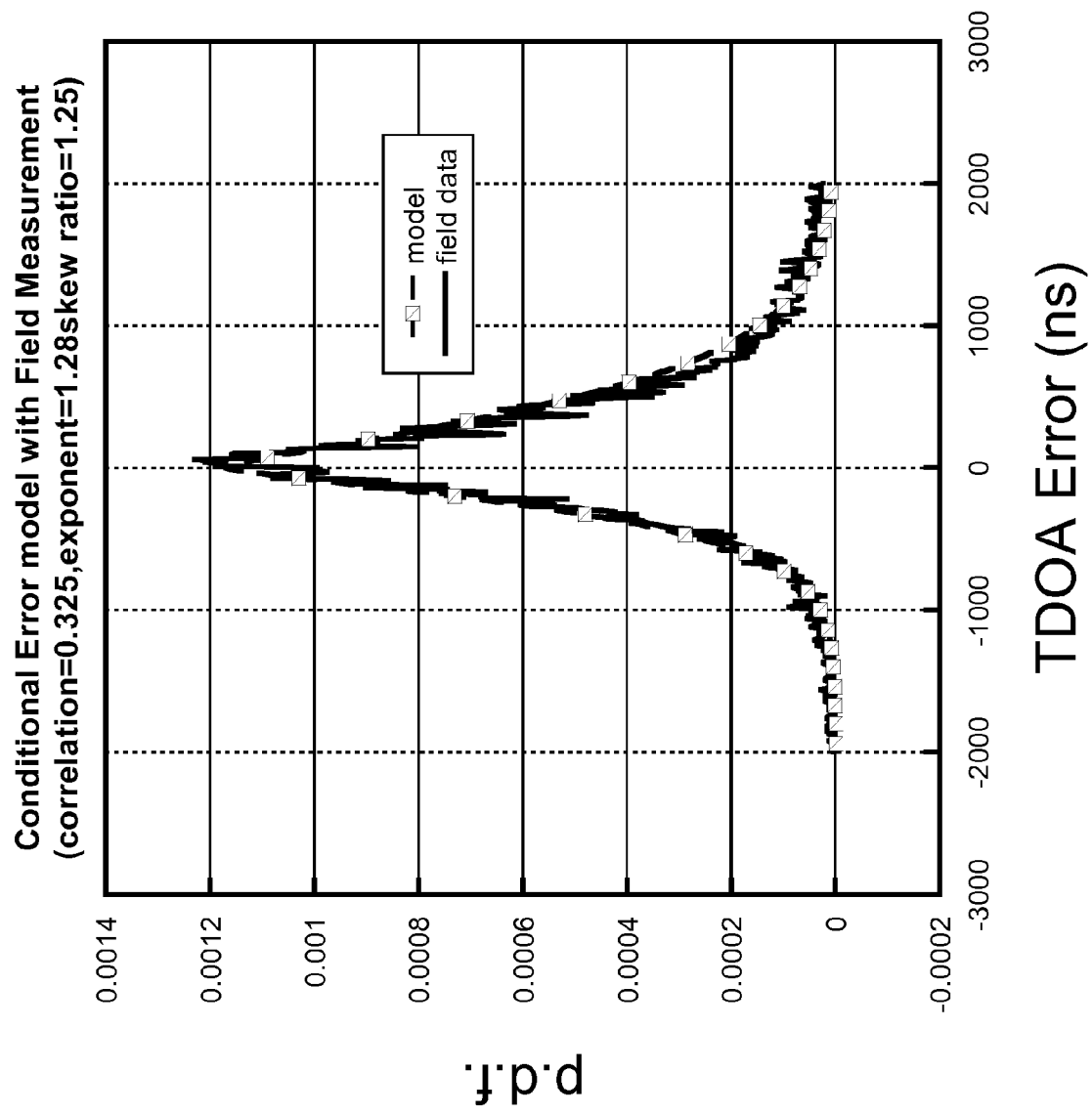
FIG. 13: Sample conditional error distribution vs. new model (large skew).

Exemplary results of the fine model adjustments are shown in FIG. 12 where there is a small skew at higher correlation. FIG. 13 shows an example when there is a large skew at lower correlation. These figures illustrate that further improvement in the error distribution model is achieved relative to FIG. 10.

Correlation Matrix

The field data is also used to analyze the correlation that exists between errors for different ports as shown in FIG. 5. The correlation between errors is computed based on various rules or conditions. Exemplary rules for computing the correlation between two ports include:

Apply a fixed correlation between ports on the same sector,

Apply a fixed correlation between ports on the same site,

Apply a fixed correlation between a cooperating port and the reference port.

For each rule a normalized correlation value or correlation coefficient for the error is computed from the field data statistics (see A. Papoulis, *Probability Random Variables, and Stochastic Processes*, McGraw Hill Inc., New York, N.Y., 1984). The correlation values and rules provide input to the "populate covariance matrix and perform inversion" block 409 (FIG. 4*a*). The correlation matrix generation block computes a port by port matrix of correlation values. If multiple rules apply to a pair of ports then the largest correlation value is used in the matrix.

Weighting and Variance Computation

A weighting for each baseline is based on the RMS error from the Cramer Rao bound (see R. McDonough, A. Whalen, *Detection of Signals in Noise*, 2nd Ed., Academic Press., San Diego, Calif., 1995). The lower bound on the TDOA RMS error in AWGN (additive white Gaussian noise) is $$\sigma_i \approx \frac{\sqrt{12}\rho_i}{2\pi W (2WT)^{\frac{1}{2}} (1-\rho_i^2)^{\frac{1}{2}}} \tag{13}$$

where, W is the signal bandwidth, T is the coherent integration length and $\rho_i$ is the correlation of the ith baseline. Since the mean error in AWGN is close to zero, the standard deviation of the error is approximately the RMS error. The weight is one over the RMS error squared, giving a theoretical weighting as $$W_i = \frac{1}{\sigma_i^2} \tag{14}$$

These exemplary weighting operations are performed after the field data analysis in the "Compute Weights" block 407 as shown in FIG. 4. Other effects may be included to account for degradations such as multipath which further increases the RMS error.

Covariance Matrix Computation

A covariance matrix may be required for making decisions using the joint error density. The covariance matrix, C, is a port by port matrix of the covariance between the ith and jth port which is computed as $$c_{ij} = \beta_{ij} \sigma_i \sigma_j \tag{15}$$

where, $\beta_{ij}$ is the correlation coefficient between the ith and jth port from the correlation matrix.

Alternatively this step may be bypassed for computational efficiency if the correlation levels between ports are deemed to be too small. An exemplary decision criterion is to use the covariance matrix if at least one of the $\beta_{ij}$ exceeds a correlation threshold. If this threshold is not exceeded a flag is set to use an independent error analysis.

MAP Decision Metric Computation

The MAP decision computation using the joint error density employs a further generalization for correlated UTDOA errors. Staring with joint Gaussian errors, the a posteriori probability is $$\ln(f_{L|e}(L|e)) = \ln\left(Ge^{-\frac{1}{2}eC^{-1}e^T}\right) = \ln(G) - \frac{1}{2}eC^{-1}e^T \tag{16}$$

where, G is a constant. In terms of the individual UTDOA errors $$\ln(f_{L|e}(L|e)) = \ln(G) - \frac{1}{2}\sum_j \sum_i e_i e_j d_{ij} \tag{17}$$

where, $d_{ij}$ are elements of $C^-$. Assuming the model in equation (8) for the marginal error probability density, the following generalization is made to equation (17) for the joint density, $$\ln(f_{L|e}(L|e)) = \tag{18}$$
$$\ln(G) - k \sum_j \sum_i s_{ij} |h(r_i, e_i)|^{\frac{p_i}{2}} |h(r_j, e_j)|^{\frac{p_j}{2}} |d_{ij}|^{\frac{(p_i+p_j)}{4}}$$

where, $$h(r_i, e_i) = \begin{cases} r_i e_i & e_i \geq 0 \\ \dfrac{e_i}{r_i} & e_i < 0 \end{cases} \tag{19}$$

$$s_{ij} = \text{sgn}\{h_i(r)\}\text{sgn}\{h_j(r)\}\text{sgn}\{d_{ij}\} \tag{20}$$

and $$sgn(x) = \begin{cases} 1 & x > 0 \\ 0 & x = 0 \\ -1 & x < 0 \end{cases} \tag{21}$$

Substituting (18) and the natural log of (7) into (5) gives $$\ln(f_{L|e}(L\mid\underline{e})) = \ln(G) - \quad (22)$$

$$k\sum_j\sum_i s_{ij}\left|h(r_i, e_i)\right|^{\frac{p_i}{2}}\left|h(r_j, e_j)\right|^{\frac{p_j}{2}}|d_{ij}|^{\frac{(p_i+p_j)}{4}} + \ln(\lambda_a) - \lambda_a D$$

Since the objective is to find the x,y,z and B that maximizes (22), the terms that do not depend on x,y,z and B can be ignored, giving:

$$\operatorname*{argmax}_{x,y,z,B}(\ln(f_{L|e}(L\mid\underline{e}))) = \quad (23)$$

$$\operatorname*{argmax}_{x,y,z,B}\left(-k\sum_j\sum_i s_{ij}|h(r_i, e_i(x, y, z))|^{\frac{p_i}{2}}|h(r_j, e_j(x, y, z))|^{\frac{p_j}{2}}\right.$$

$$\left.|d_{ij}|^{\frac{(p_i+p_j)}{4}} - \lambda_a D(x, y, z)\right)$$

For computational efficiency, equation (23) may be divided by −k and the x,y,z that minimizes $$-\frac{1}{k}\ln(f_{L|e}(L\mid\underline{e}))$$

is found as $$\operatorname*{argmax}_{x,y,z,B}(\ln(f_{L|e}(L\mid\underline{e}))) = \operatorname*{argmin}_{x,y,z,B}\left(-\frac{1}{k}\ln(f_{L|e}(L\mid\underline{e}))\right) \quad (24)$$

$$= \operatorname*{argmin}_{x,y,z,B}\left(\sum_j\sum_i s_{ij}\right.$$

$$|h(r_i, e_i(x, y, z, B))|^{\frac{p_i}{2}}|$$

$$|h(r_j, e_j(x, y, z, B))|^{\frac{p_j}{2}}|d_{ij}|^{\frac{(p_i+p_j)}{4}} +$$

$$\left.\frac{\lambda_a}{k}D(x, y, z)\right)$$

The decision metric to be minimized is then $$M = \sum_j\sum_i s_{ij}|h(r_i, e_i(x, y, z, B))|^{p_i/2} \quad (25)$$

$$|h(r_j, e_j(x, y, z, B))|^{p_j/2}|d_{ij}|^{(p_i+p_j)/4} + \frac{\lambda_a}{k}D(x, y, z)$$

For locations where there is low (~0) cross-correlation between baselines, the covariance matrix is diagonal. Independence is assumed between UTDOA errors simplifying (25) to $$M = \sum_i \frac{1}{\sigma_i^p}|h(r_i, e_i(x, y, z, B))|^{p_i} + \frac{\lambda_a}{k}D(x, y, z) \quad (26)$$

In terms of the pre-computed weights for each baseline, the metric is $$M = \sum_i W_i^{p_i/2}|h(r_i, e_i(x, y, z, B))|^{p_i} + \frac{\lambda_a}{k}D(x, y, z) \quad (27)$$

Figure 14:
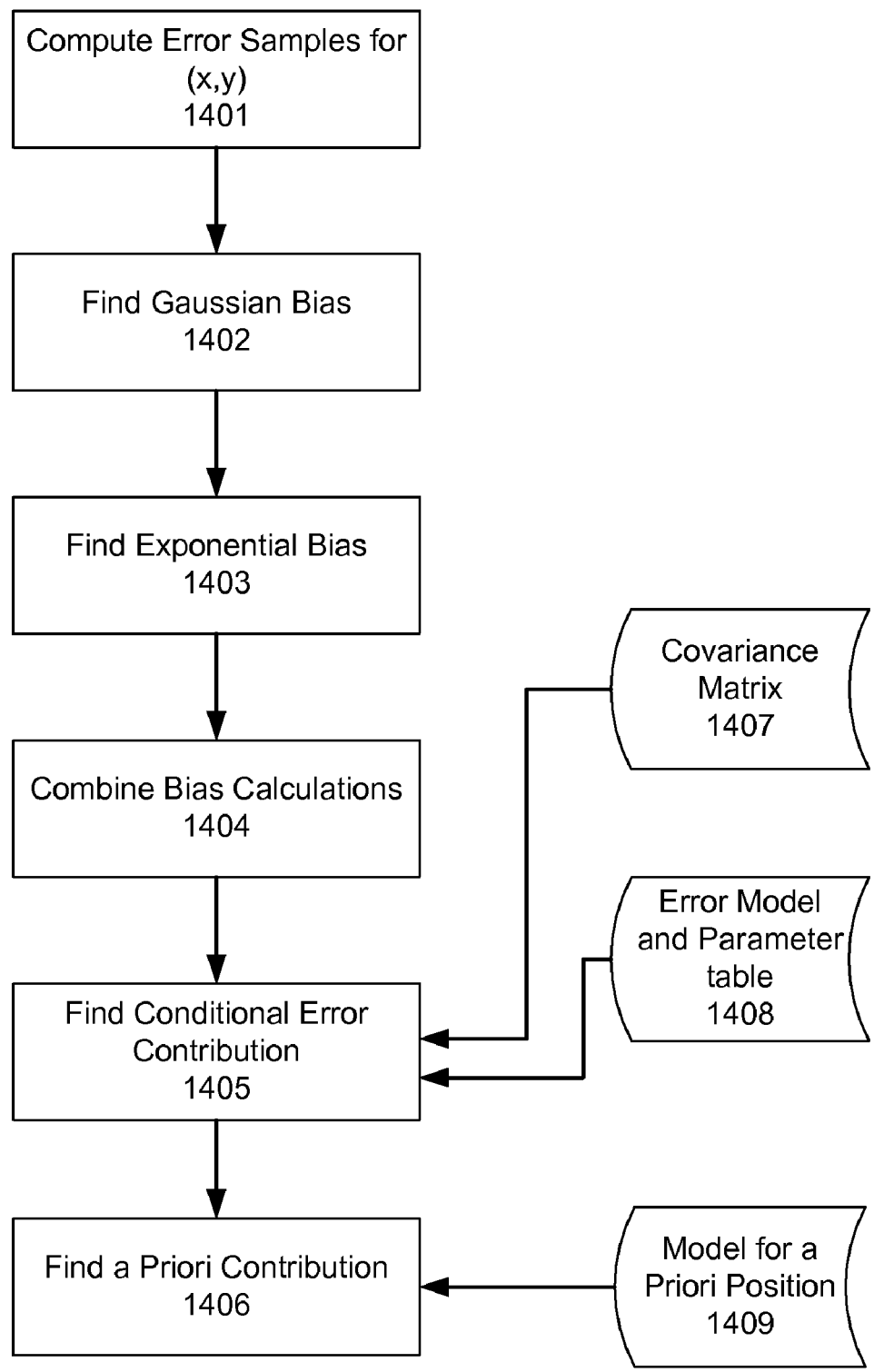
FIG. 14: Logic flow of MAP decision metric computation.

FIG. 14 shows the logic flow for the MAP decision metric computation at each x,y,z value. The error samples are computed for the x,y,z being considered 1401. In general, an analytical solution for the common bias, "B", in equation (27) that minimizes M is difficult to compute. Therefore, the biases at two relatively easy to compute sample points ($p_i=1$, $r_i=1$ and $p_i=2$, $r_i=1$) are found and combined to provide an approximation. A minimum bias is computed assuming Gaussian statistics 1402 for the errors followed by a computation assuming double exponential statistics 1403. The bias to be used is then found by combining the two bias points 1404. The combining can be done by simply taking the average of the Gaussian and double exponential biases. Alternatively, the bias for arbitrary $p_i$ and $r_i$ can be found through a search over all possible biases at the cost of complexity. If this is done, the average of the two bias samples is used as a starting point for the search. Alternatively, the search can be done offline and compared with the bias results for the two bias samples. In this case, the average percentage deviation from the two bias points may be used in the combining at the cost of offline analysis. After combining the sample biases, the conditional error contribution is determined 1405 using the combined bias 1405, the covariance matrix 1407, and the Error Model and Parameter table as previously developed from the field data. The computed conditional error contribution 1405 and the previously developed Model for A Priori Position 1409 are then used to find an a priori contribution 1406 to the MAP metric. The minimum of the metric computation in FIG. 14 over x,y,z with various geographical map resolutions and iterations provides the final solution as depicted in FIG. 4.

Gaussian Bias

The Gaussian bias is found by setting $p_i=2$ and $r_i=1$ in (27). Note that for $r_i=1$, $h(r_i=1,e_i(x,y,z,B))=e_i(x,y,z,B)$ giving $$M = \sum_{i=1}^{N}(\Delta\tau_i - B)^2 W_i \quad (28)$$

where,

N is the number of baselines $\Delta\tau_i \equiv \hat{\tau}_i - \tau_i(x,y,z)$ is the unbiased error.

A minimum solution over the bias is found by setting the derivative of (28) with respect to B equal to zero and solving for B giving $$B = \sum_{i=1}^{N}\Delta\tau_i W_i \bigg/ \sum_{i=1}^{N} W_i. \quad (29)$$

Equation (29) provides a bias when the error distributions are Gaussian.

Exponential Bias

The exponential bias is found by setting $p_i=1$ and $r_i=1$ in (27) giving $$M = \sum_{i=1}^{N} |\Delta\tau_i - B| \sqrt{W_i} \qquad (30)$$

Again, a minimum solution over the bias is found by setting the derivative of (28) with respect to B equal to zero and solving for B. The derivative of each term with respect to B is $$\frac{d}{dB}|\Delta\tau_i - B|\sqrt{W_i} = \begin{cases} \sqrt{W_i} & B \geq \Delta\tau_i \\ -\sqrt{W_i} & B < \Delta\tau_i \end{cases} \qquad (31)$$

$$= \sqrt{W_i}\,[U(B - \Delta\tau_i) - U(\Delta\tau_i - B)]$$

where, U(x) is a unit step function (see A. Oppenhem and A. Willsky, *Signals and Systems*, Prentice-Hall, Inc., Englewood Cliffs, N.J., 1983). Setting the derivative of the sum equal to zero gives $$\frac{dM}{dB} = \sum_{i=1}^{N} \sqrt{W_i}\,[U(B - \Delta\tau_i) - U(\Delta\tau_i - B)] = 0 \qquad (32)$$

Each term in (32) as a function of B is $-\sqrt{W_i}$ until the value $\Delta\tau_i$ is reached and then there is a step to $\sqrt{W_i}$ for B greater than $\Delta\tau_i$. Due to these discontinuities, there is no exact solution for B. However, a value for B can be found that provides an approximate solution.

Figure 15:
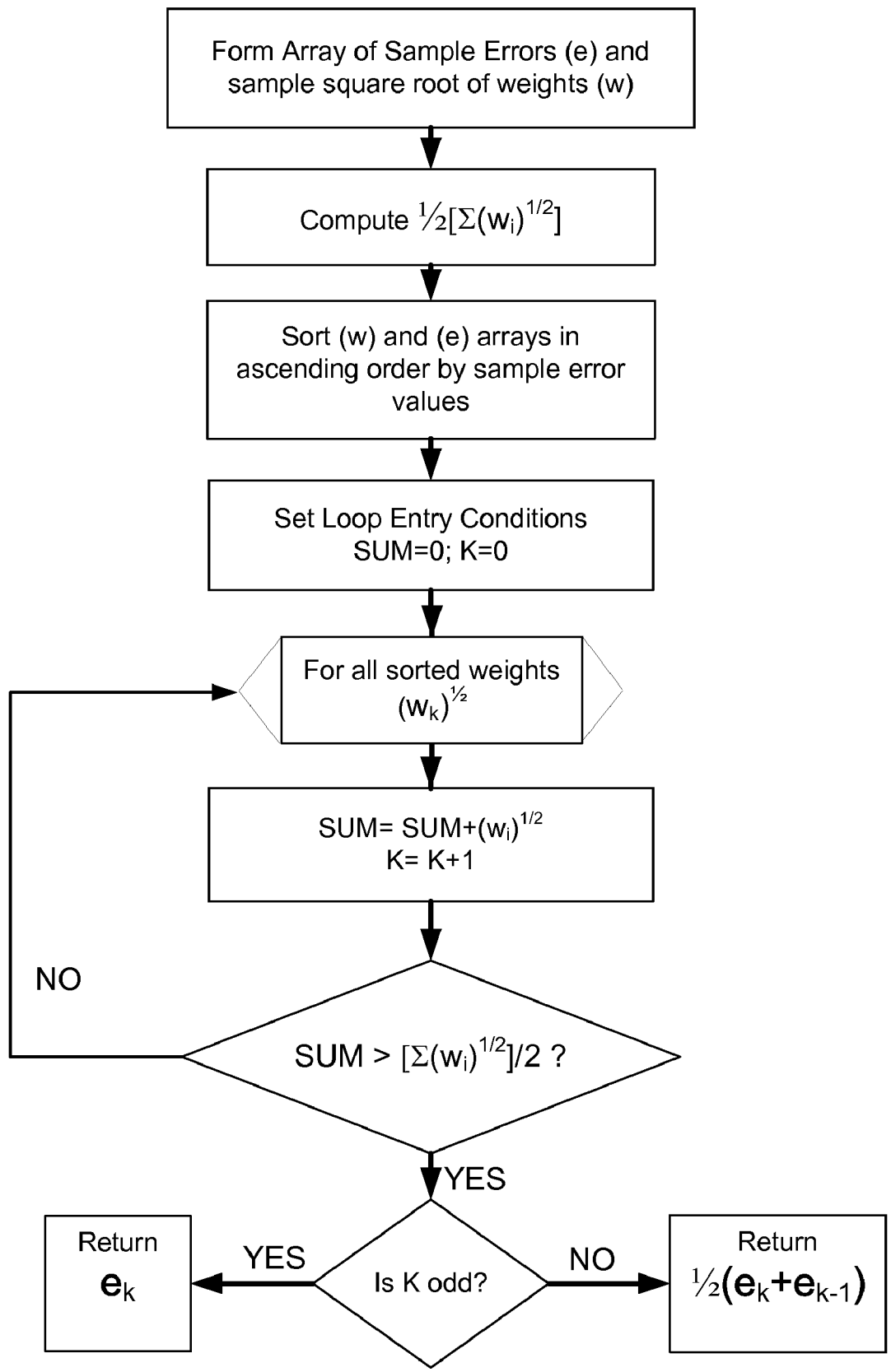
FIG. 15: Bias calculation for double exponential assumption (p=1,r=1).

A solution in FIG. 15 orders the summation in (32) according to increasing $\Delta\tau_i$. The value of B is then found that makes (32) as close as possible to zero. This occurs at a value of B where the kth step transition has occurred making the sum of the negative terms approximately equal to the sum of the positive terms (i.e.

$$\sum_{i=1}^{K} \sqrt{W_i} \approx -\sum_{i=K+1}^{N} \sqrt{W_i}$$

where N is the total number of baselines in the ordered summation). In the figure the weight and sample arrays are populated and sorted. A threshold is computed that is $$\sum_{i=1}^{N} \sqrt{W_i}\,/\,2$$

to provide a stopping condition. The terms are accumulated in order from the terms with the smallest to the largest transition point. At the point where the threshold is reached, the value $\Delta\tau_K$ is returned if there are an odd number of terms; otherwise, the kth term's transition point is averaged with the prior term's transition point.

Metric Calculation

Figure 16:
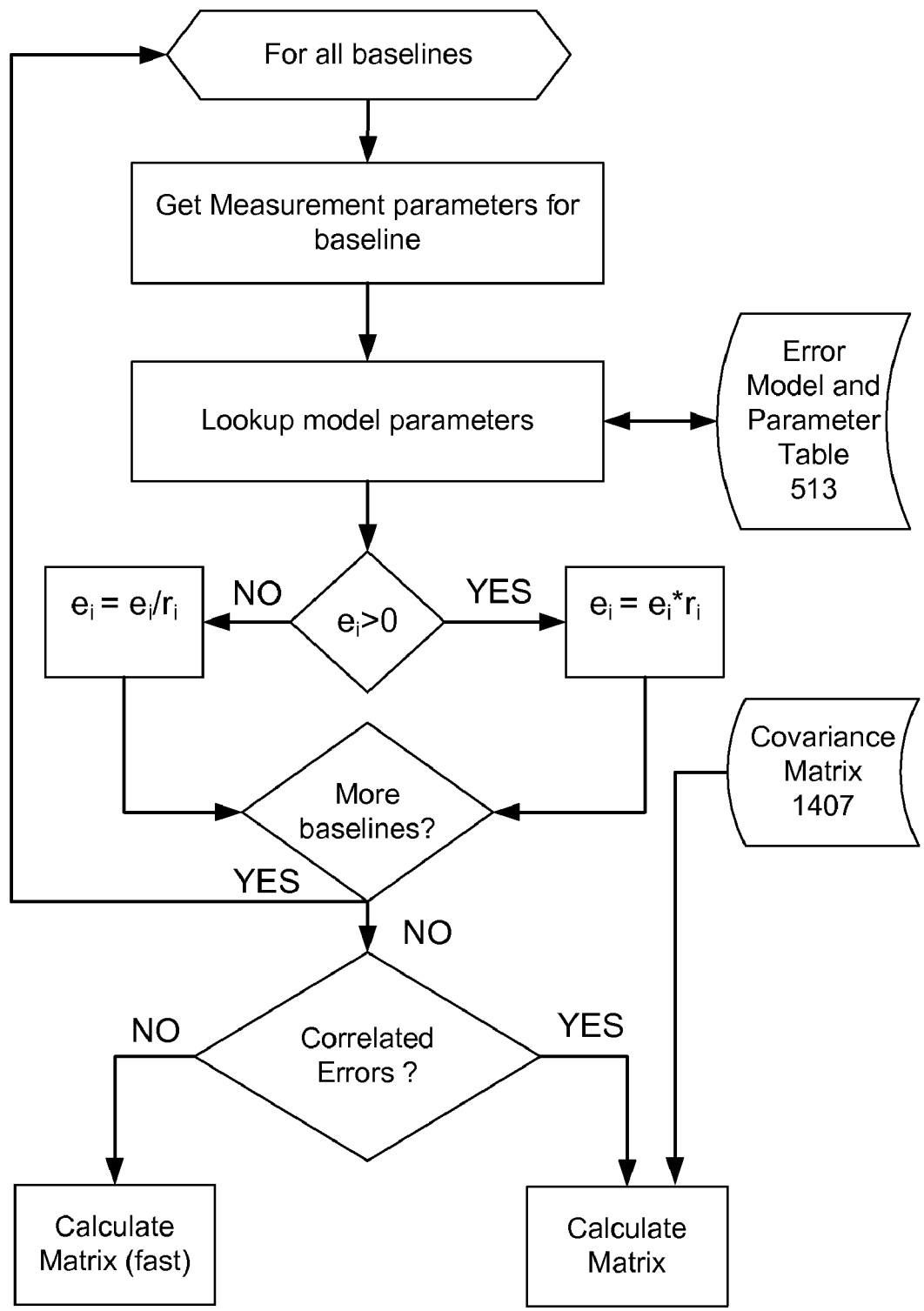
FIG. 16: Conditional error calculation.

The first term in (27) is computed following the steps in FIG. 16. For each baseline, the measurement parameters such as UTDOA correlation, the number of baselines and multipath parameters are determined. These measurement parameters are used to determine error model parameters, $p_i$ and $r_i$, from a lookup table or through a direct calculation using a parameter fitting model. The errors are adjusted depending on the skew. Finally, the summation in the metric is computed using (25) when the errors have significant correlation or using (27) when the errors do not have significant correlation. The significance of the correlation is determined as part of the covariance matrix computations in FIG. 4. Finally, the last term in (27) and (25) is computed using (6) to account for the a priori probability.

Sample Results

Table 1 below illustrates sample improvements relative to a weighted least squares algorithm. Using approximately 46,000 location measurements, the distribution of positioning errors were compiled using the weighted least squares algorithm and the algorithm above. The parameters for the above model were chosen using a separate training data set of 32,000 locations. The table shows improvement of approximately 20 meters and 2 meters in the 95th and $67^{th}$ percentiles respectively. The average error improved by approximately 15 meters.

TABLE 1

Exemplary Results Relative to Weighted Least Squares Method

| Error (m) | Weighted Least Squares | MAP |
|---|---|---|
| $67^{th}$ percentile | 74.7 | 72.9 |
| $95^{th}$ percentile | 293.1 | 271.3 |
| Average | 287.9 | 272.6 |

CONCLUSION

The present invention, and the scope of protection of the following claims, is by no means limited to the details described hereinabove. Those of ordinary skill in the field of wireless location will appreciate that various modifications may be made to the illustrative embodiments without departing from the inventive concepts disclosed herein.

What is claimed:

1. A method for use in a wireless location system, comprising:
   obtaining field data, wherein said field data have baseline or location dependent values to be used in a signal correlation model;
   analyzing said field data to obtain (1) said signal correlation model and associated measurement parameters, (2) correlation matrix rules, and (3) a model for a priori position;
   computing weights for the measurements based on an estimated variability of the measurement;
   using the weights along with the correlation matrix rules to generate a covariance matrix and computing an inverse covariance matrix;
   performing an iterative search over a geographical region to find a location with a maximum a posteriori (MAP) metric;
   determining that a stopping condition has been reached; and
   reporting the geographic position with the largest MAP metric as the location solution.

2. A method as recited in claim 1, further comprising generating a table providing a mapping between the measurement parameters for a skew and a correlation value for the measurement.

3. A method as recited in claim 1, further comprising generating a table providing a mapping between the measurement parameters for a skew and the number of baselines.

4. A method as recited in claim 3, wherein said performing an iterative search further comprises:

determining measurement parameters for each baseline and using the measurement parameters to determine error model parameters; and updating the error model parameters as a function of the skew.

5. A method as recited in claim 4, wherein the error model parameters are determined from a lookup table.

6. A method as recited in claim 4, wherein the error model parameters are determined using a parameter fitting model.

7. A method as recited in claim 4, wherein a summation of the MAP metric is computed using the covariance matrix when the errors have significant correlation.

8. A method as recited in claim 4, wherein a summation of the MAP metric is computed using a fast matrix calculation when the errors do not have significant correlation.

9. A method as recited in claim 1, further comprising analyzing the correlation between different receiver ports linking the location receiver to an external antenna, and providing correlation values and rules for their application.

10. A method as recited in claim 1, wherein said iterative search includes a resolution loop in which a geographic search space resolution is reduced in each iteration and new test points are generated via interpolation.

11. A method as recited in claim 10, wherein the search is re-centered at the previous iteration's minimum error point before proceeding, wherein test points within the current geographical region search space are individually searched and a MAP metric is computed for each test point.

12. A method as recited in claim 1, wherein the iterative search includes a MAP metric computation that uses the covariance matrix, an error model and a measurement parameter table.

13. A method as recited in claim 12, wherein the error model comprises an error distribution and the field data is analyzed to obtain the error distribution.

14. A method as recited in claim 13, wherein the measurement parameters are analyzed to identify which measurement parameters cause large changes in the error distribution, further comprising determining ranges and bin sizes for the identified measurement parameters.

15. A method as recited in claim 14, further comprising:
applying a coarse modeling step comprising computing values for error model parameters that match the field data; and
applying results of the coarse modeling step to update the error model.

16. A method as recited in claim 15, further comprising applying a fine modeling step and applying results of the fine modeling step to update the error model.

17. A method as recited in claim 16, wherein said fine modeling step comprises accumulating conditional statistics over the field data based on ranges and bin sizes.

18. A method as recited in claim 17, further comprising determining the conditional error by computing a skew ratio based on the mean and standard deviation of the error for each measurement parameter bin and selecting as the conditional error a center of the bin.

19. A method as recited in claim 1, wherein the method is performed in a wireless location system (WLS) employing a time of arrival (TOA) location algorithm.

20. A method as recited in claim 1, wherein the method is performed in a wireless location system (WLS) employing a time difference of arrival (TDOA) location algorithm.

21. A method as recited in claim 20, wherein the TDOA location algorithm comprises an uplink time difference of arrival location algorithm.

22. A method as recited in claim 20, wherein the TDOA location algorithm comprises a downlink time difference of arrival location algorithm.

23. A method as recited in claim 22, wherein the downlink time difference of arrival location algorithm comprises the use of downlink satellite beacons from a global positioning system (GPS).

24. A method as recited in claim 23, wherein the method is performed in a WLS employing an assisted GPS location system.

25. A method as recited in claim 1, wherein the method is performed in a wireless location system (WLS) employing an angle of arrival (AOA) location algorithm.

26. A method as recited in claim 1, wherein the method is performed in a wireless location system (WLS) employing a hybrid location algorithm.

27. A method as recited in claim 26, wherein the hybrid location algorithm employs uplink signals from a mobile device and downlink signals received at the mobile device.

28. A method as recited in claim 1, wherein said performing an iterative search further comprises:
approximating a common bias by computing a first bias point by assuming Gaussian statistics for the errors and a second bias point by a computation assuming double exponential statistics; and
determining the common bias by combining the first and second bias points.

29. A method as recited in claim 28, further comprising:
determining a conditional error contribution using the common bias, the covariance matrix, the error model, and the measurement parameter table.

30. A method as recited in claim 29, wherein said second bias point is computed by:
populating and sorting weight and sample arrays;
computing a threshold as $$\sum_{i=1}^{N} \sqrt{w_i} / 2$$

to provide the stopping condition;
accumulating the terms in order from terms with the smallest to the largest transition point; and
at the point where the threshold is reached, returning $\Delta\tau_K$ when there are an odd number of terms and otherwise averaging the kth term's transition point with the prior term's transition point.

* * * * *

UNITED STATES PATENT AND TRADEMARK OFFICE
CERTIFICATE OF CORRECTION

| | | |
|---|---|---|
| PATENT NO. | : 7,956,808 B2 | Page 1 of 1 |
| APPLICATION NO. | : 12/346146 | |
| DATED | : June 7, 2011 | |
| INVENTOR(S) | : Boyer et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 322 days.

Signed and Sealed this
Twenty-sixth Day of July, 2011

David J. Kappos
*Director of the United States Patent and Trademark Office*